(12) United States Patent
Jang et al.

(10) Patent No.: US 11,194,221 B2
(45) Date of Patent: Dec. 7, 2021

(54) LIQUID LENS, LIQUID LENS MODULE INCLUDING THE LENS, CAMERA MODULE INCLUDING THE SAME, AND METHOD FOR CONTROLLING THE LENS

(71) Applicant: LG INNOTEK CO., LTD., Seoul (KR)

(72) Inventors: Hyun Woong Jang, Seoul (KR); Young Seop Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 60 days.

(21) Appl. No.: 16/480,279

(22) PCT Filed: Jan. 24, 2018

(86) PCT No.: PCT/KR2018/001086
§ 371 (c)(1),
(2) Date: Jul. 23, 2019

(87) PCT Pub. No.: WO2018/139859
PCT Pub. Date: Aug. 2, 2018

(65) Prior Publication Data
US 2019/0377236 A1    Dec. 12, 2019

(30) Foreign Application Priority Data

Jan. 24, 2017 (KR) .......................... 10-2017-0011346
Apr. 11, 2017 (KR) .......................... 10-2017-0047064

(51) Int. Cl.
*G02F 1/29* (2006.01)
*G02B 27/64* (2006.01)
(Continued)

(52) U.S. Cl.
CPC ............ *G02F 1/29* (2013.01); *G02B 27/646* (2013.01); *H04N 5/2253* (2013.01);
(Continued)

(58) Field of Classification Search
CPC .......... G02B 27/646; G02B 3/12; G02B 3/14; G02B 7/00; G02B 7/021; G02B 6/3576;
(Continued)

(56) References Cited

U.S. PATENT DOCUMENTS 7,898,302 B1    3/2011  Casiraghi
8,184,188 B2 *  5/2012  Yaghmai ............ H04N 5/37457
                                                    348/308
(Continued)

FOREIGN PATENT DOCUMENTS

CN    1914540 A      2/2007
EP    2 778 734 A1   9/2014
(Continued)

*Primary Examiner* — Chiawei Chen
(74) *Attorney, Agent, or Firm* — Birch, Stewart, Kolasch & Birch, LLP

(57) ABSTRACT

The present invention provides a camera module including a liquid lens, the camera module comprising: a first plate including a cavity in which conductive liquid and non-conductive liquid are arranged; a common electrode disposed on the first plate; an individual electrode disposed below the first plate; a second plate disposed on a first electrode; and a third plate disposed below a second electrode.

10 Claims, 14 Drawing Sheets

(51) Int. Cl.
*H04N 5/225* (2006.01)
*H04N 5/232* (2006.01)
*G02B 7/02* (2021.01)

(52) U.S. Cl.
CPC ......... *H04N 5/2254* (2013.01); *H04N 5/2328* (2013.01); *H04N 5/23258* (2013.01); *G02B 7/021* (2013.01); *G02F 1/294* (2021.01); *G02F 2201/121* (2013.01)

(58) Field of Classification Search
CPC ....... G02C 7/08; G02F 1/29; G02F 2001/294; G02F 2201/121; H04N 5/225; H04N 5/2253; H04N 5/2254; H04N 5/232; H04N 5/23258; H04N 5/2328
See application file for complete search history.

(56) References Cited

U.S. PATENT DOCUMENTS

| | | | |
|---|---|---|---|
| 9,470,937 B2 * | 10/2016 | Li | G02F 1/29 |
| 10,063,755 B2 * | 8/2018 | Leu | H04N 5/232123 |
| 10,078,986 B2 * | 9/2018 | Hadwen | G09G 3/348 |
| 2002/0102102 A1 * | 8/2002 | Watanabe | G02B 15/10 396/89 |
| 2006/0045504 A1 * | 3/2006 | Zarnowski | G02B 7/102 396/79 |
| 2007/0279539 A1 * | 12/2007 | Suzuki | G02B 7/36 349/1 |
| 2008/0026603 A1 | 1/2008 | Kobori et al. | |
| 2008/0037973 A1 * | 2/2008 | Jung | G03B 13/32 396/89 |
| 2008/0277480 A1 | 11/2008 | Thuries et al. | |
| 2009/0166426 A1 | 7/2009 | Giebel et al. | |
| 2009/0207622 A1 * | 8/2009 | Tsuboi | G02B 26/004 362/331 |
| 2010/0194970 A1 * | 8/2010 | Kageyama | H04N 5/232123 348/349 |
| 2010/0259648 A1 * | 10/2010 | Iijima | G03B 35/10 348/241 |
| 2010/0284091 A1 * | 11/2010 | Okamoto | G02B 13/0075 359/665 |
| 2011/0200314 A1 * | 8/2011 | Kawashima | G02B 3/14 396/106 |
| 2011/0267510 A1 * | 11/2011 | Malone | H01L 27/14636 348/262 |
| 2012/0024954 A1 * | 2/2012 | Komi | G03B 13/36 235/454 |
| 2012/0026596 A1 * | 2/2012 | Berge | G02B 26/005 359/665 |
| 2012/0113318 A1 * | 5/2012 | Galstian | G02B 13/0085 348/374 |
| 2012/0257131 A1 * | 10/2012 | Galstian | G02F 1/134309 349/36 |
| 2013/0077178 A1 * | 3/2013 | Lee | G02B 26/005 359/666 |
| 2013/0148059 A1 * | 6/2013 | Park | G02F 1/133382 349/72 |
| 2014/0017625 A1 * | 1/2014 | Liu | A61B 1/0019 433/29 |
| 2014/0268361 A1 * | 9/2014 | Nunnink | G02B 3/14 359/665 |
| 2015/0070540 A1 * | 3/2015 | Wang | H01L 23/34 348/294 |
| 2015/0177479 A1 | 6/2015 | Lee et al. | |
| 2015/0338557 A1 * | 11/2015 | Nunnink | G02B 7/008 359/666 |
| 2017/0090076 A1 * | 3/2017 | Nunnink | G02B 7/08 |
| 2017/0150055 A1 * | 5/2017 | Chung | H04N 5/2254 |
| 2017/0357035 A1 * | 12/2017 | Nunnink | G02B 7/08 |
| 2018/0136372 A1 * | 5/2018 | Patscheider | G02B 7/028 |
| 2018/0164576 A1 * | 6/2018 | Tseng | G02B 26/004 |
| 2018/0180774 A1 * | 6/2018 | Nagahama | G02B 7/28 |
| 2019/0156516 A1 * | 5/2019 | Nikkanen | G06T 5/50 |
| 2019/0230262 A1 * | 7/2019 | Wang | G02B 26/004 |
| 2019/0387958 A1 * | 12/2019 | Kimpe | A61B 5/444 |

FOREIGN PATENT DOCUMENTS

| | | |
|---|---|---|
| JP | 2005-62632 A | 3/2005 |
| JP | 2007-121846 A | 5/2007 |
| JP | 2008-175918 A | 7/2008 |
| JP | 2010-262246 A | 11/2010 |
| KR | 10-2008-0014274 A | 2/2008 |
| KR | 10-0856092 B1 | 9/2008 |
| KR | 10-2016-0022656 A | 3/2016 |
| KR | 10-2016-0131367 A | 11/2016 |
| WO | WO 2008/037787 A2 | 4/2008 |
| WO | WO 2016/203029 A1 | 12/2016 |

* cited by examiner

[FIG. 1]
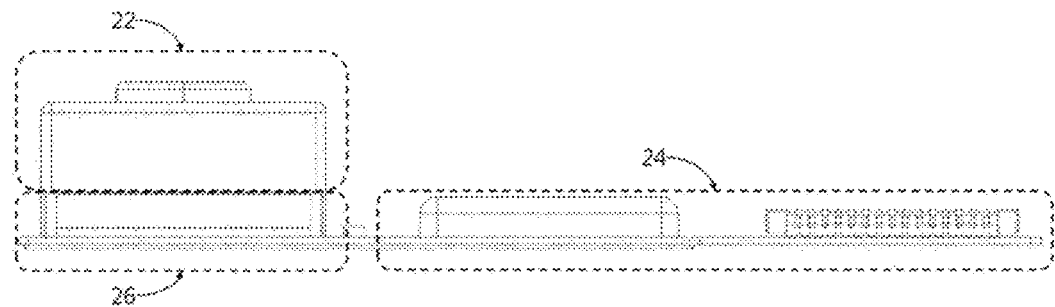
[FIG. 2]
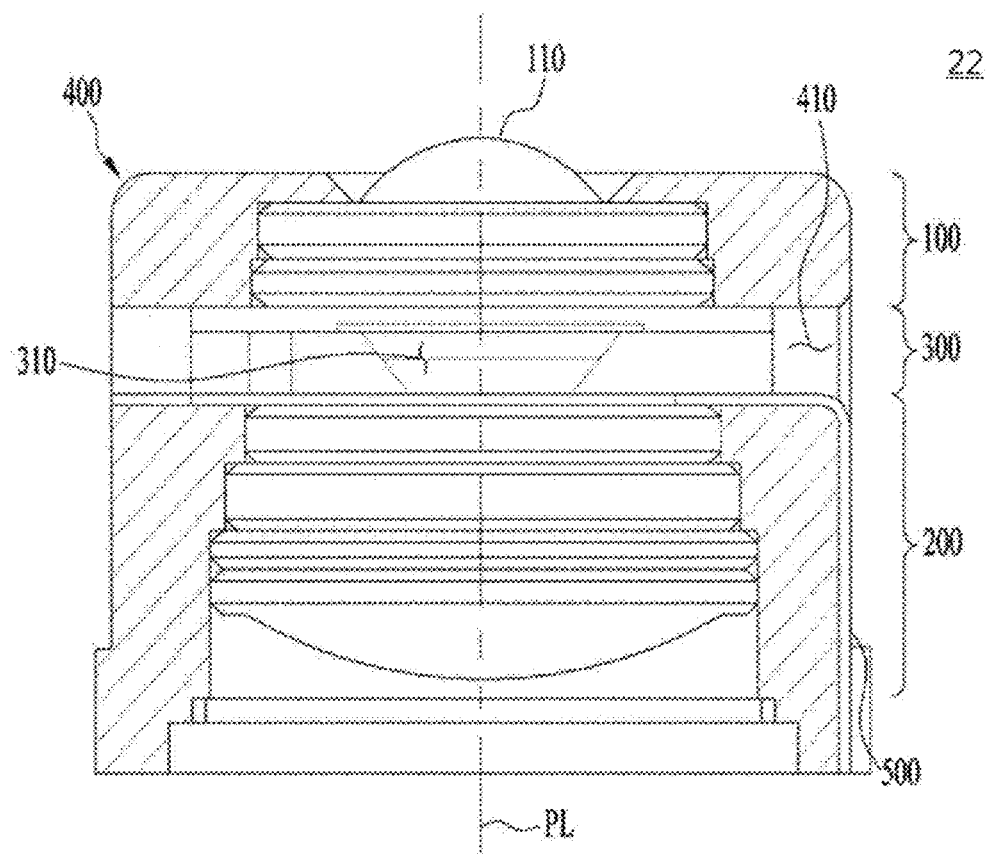

[FIG. 3a]
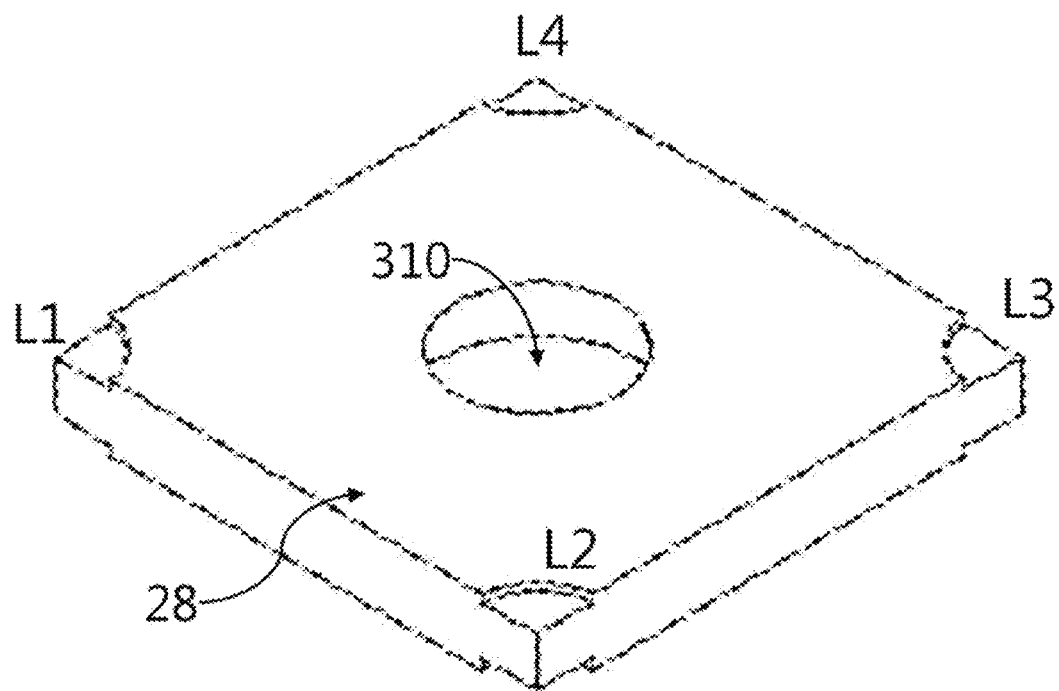

【FIG. 3b】
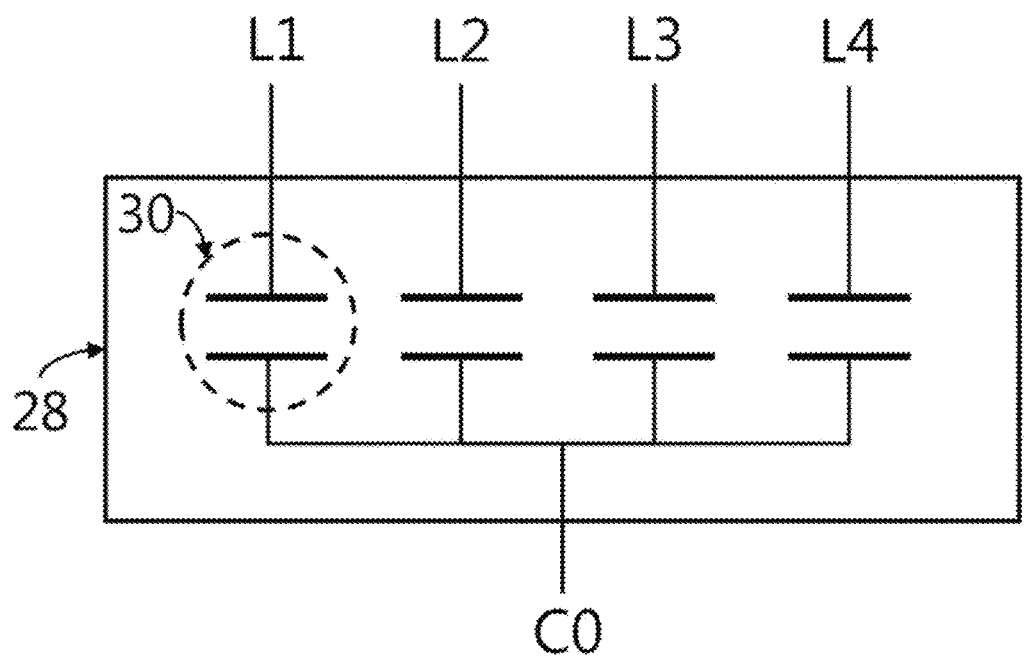
【FIG. 4】
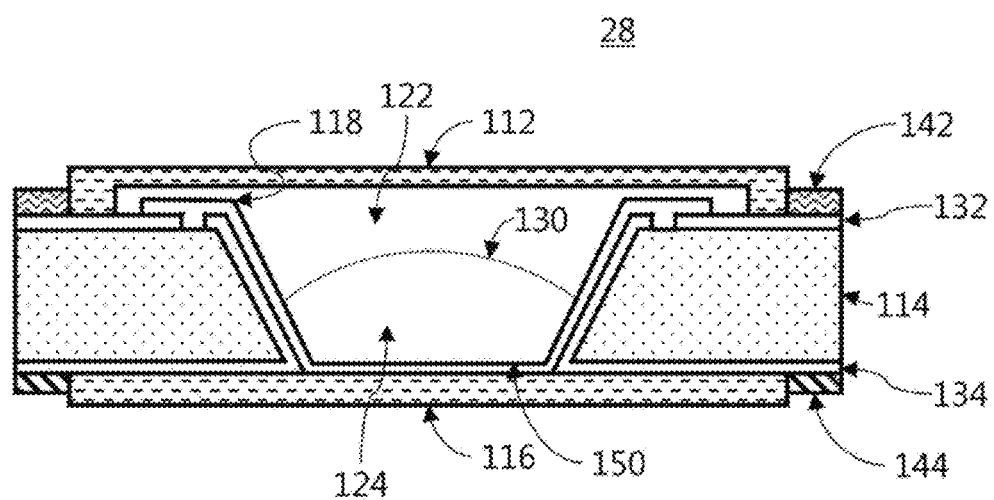

[FIG. 5a]
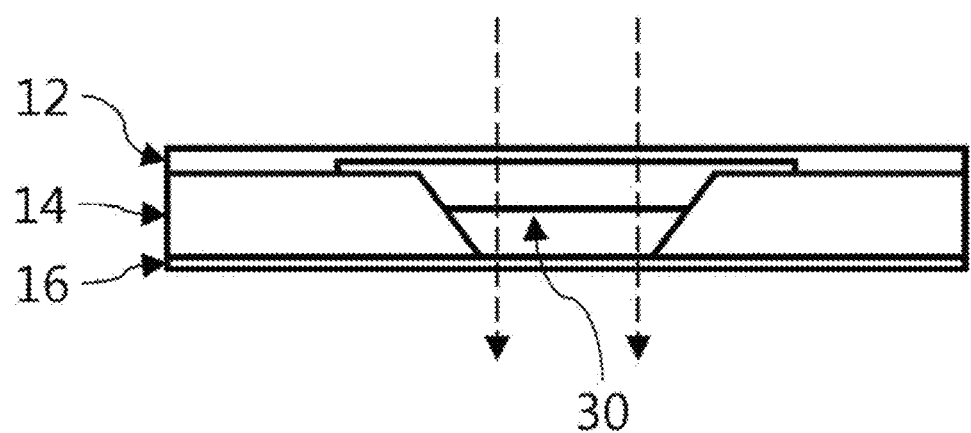
[FIG. 5b]
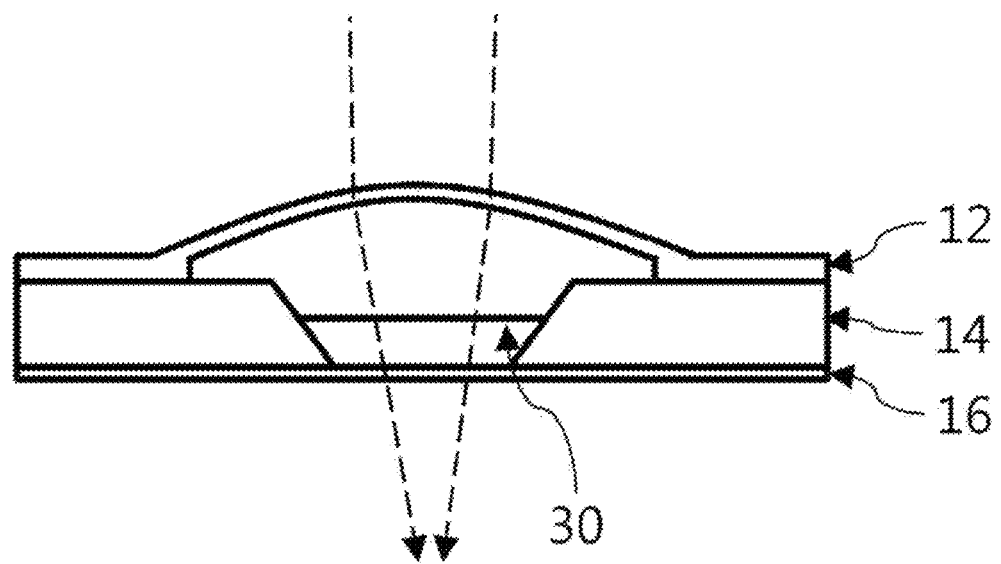

[FIG. 6a]
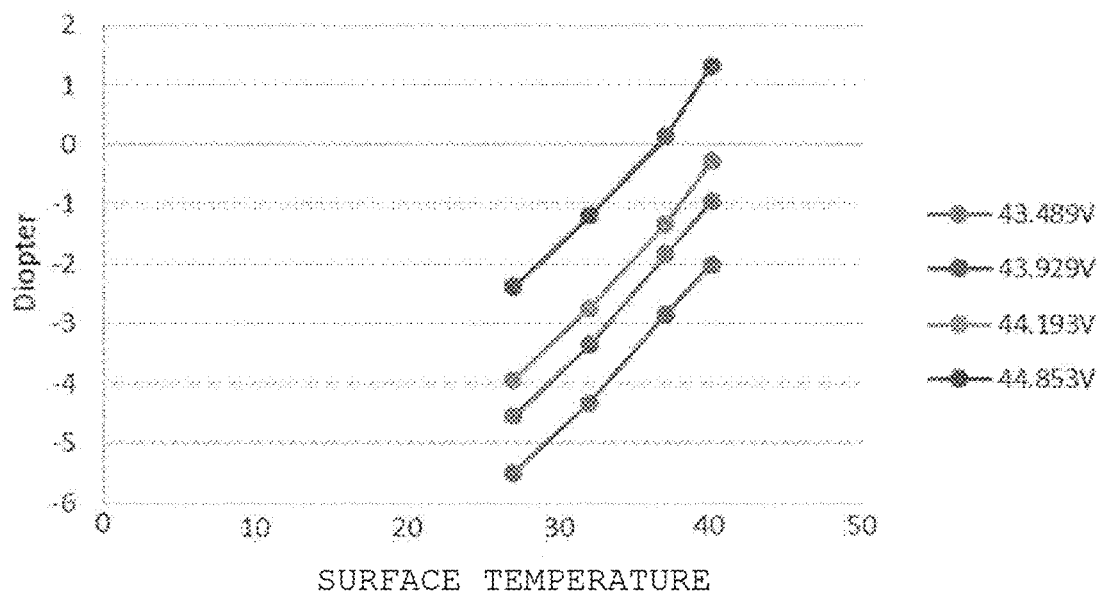
[FIG. 6b]
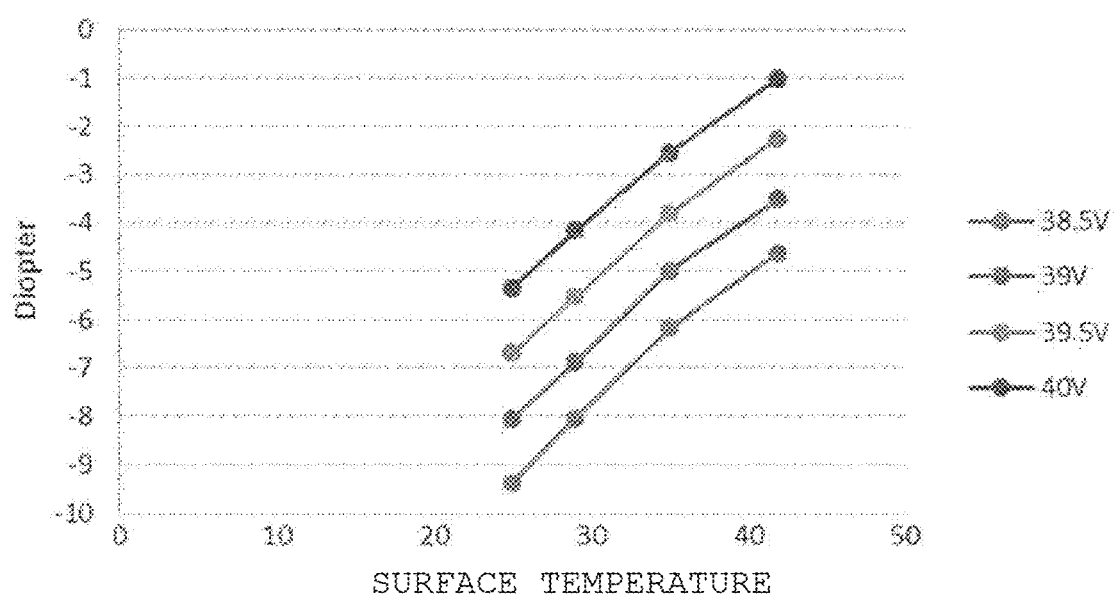

[FIG. 7a]
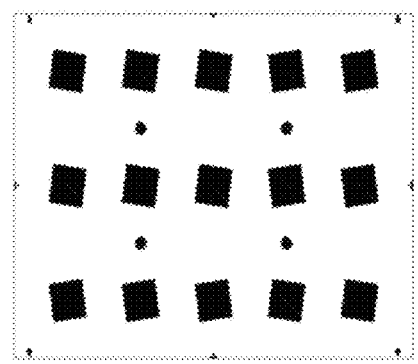
[FIG. 7b]
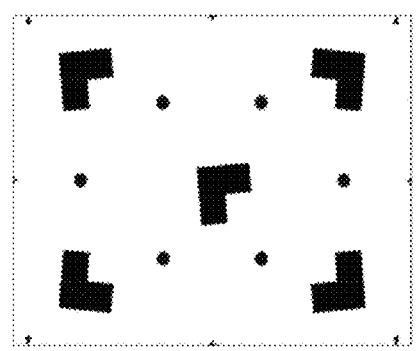
[FIG. 8a]
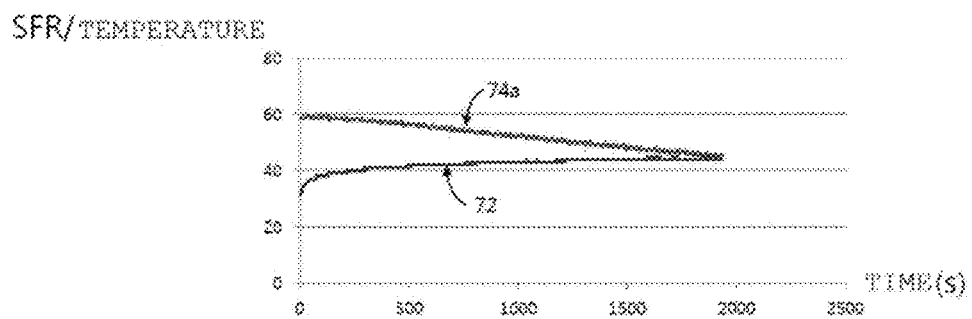

[FIG. 8b]
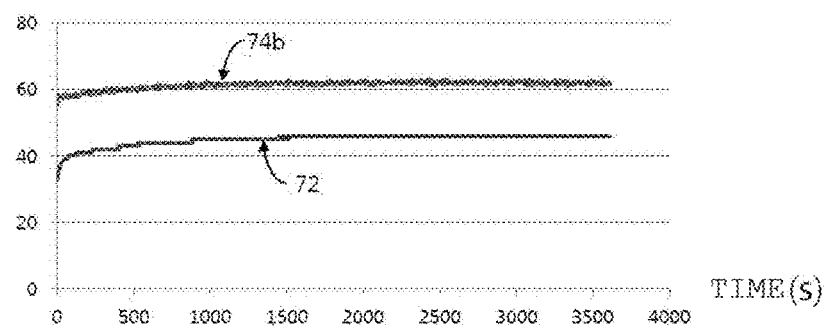
[FIG. 9]
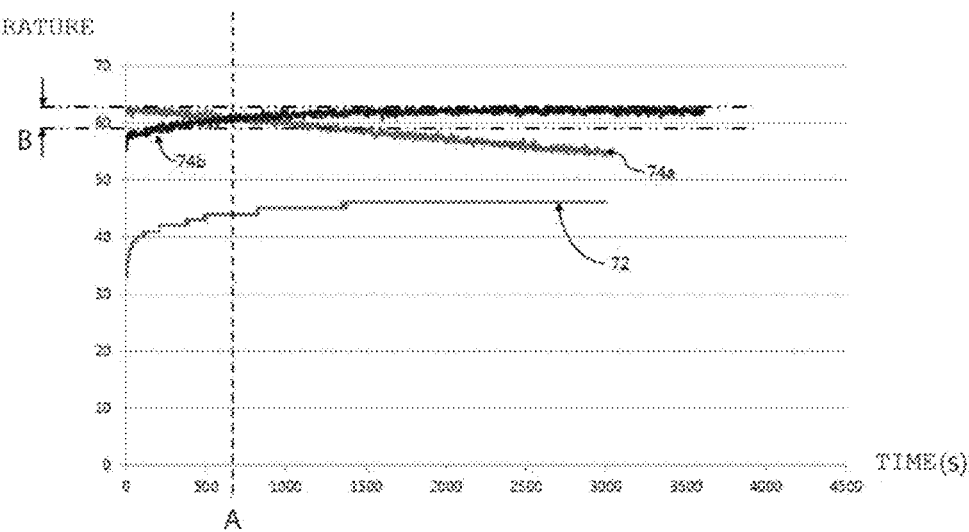

【FIG. 10】
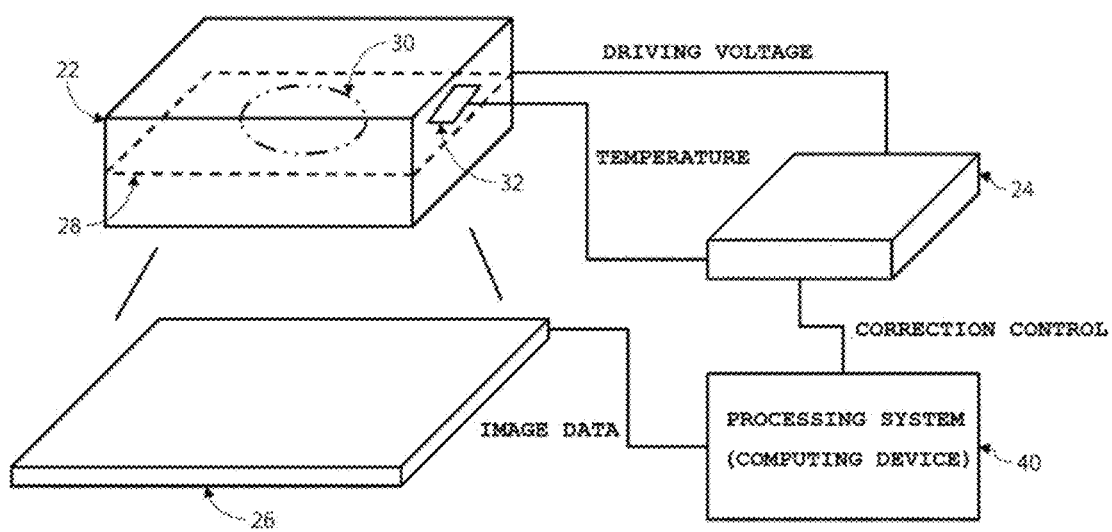

[FIG. 11]
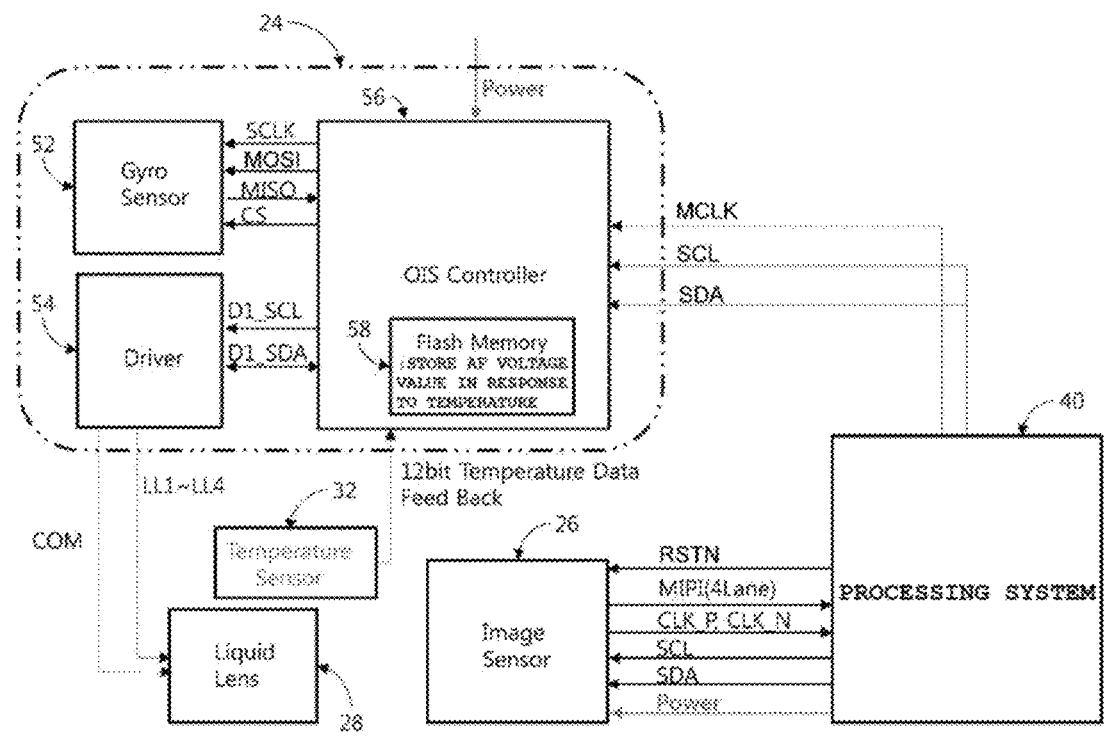
[FIG. 12]
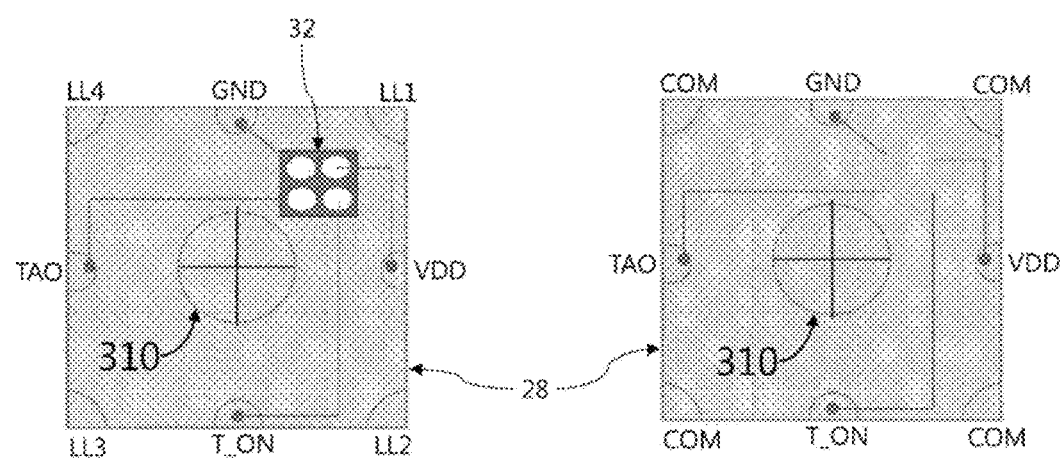

[FIG. 13]
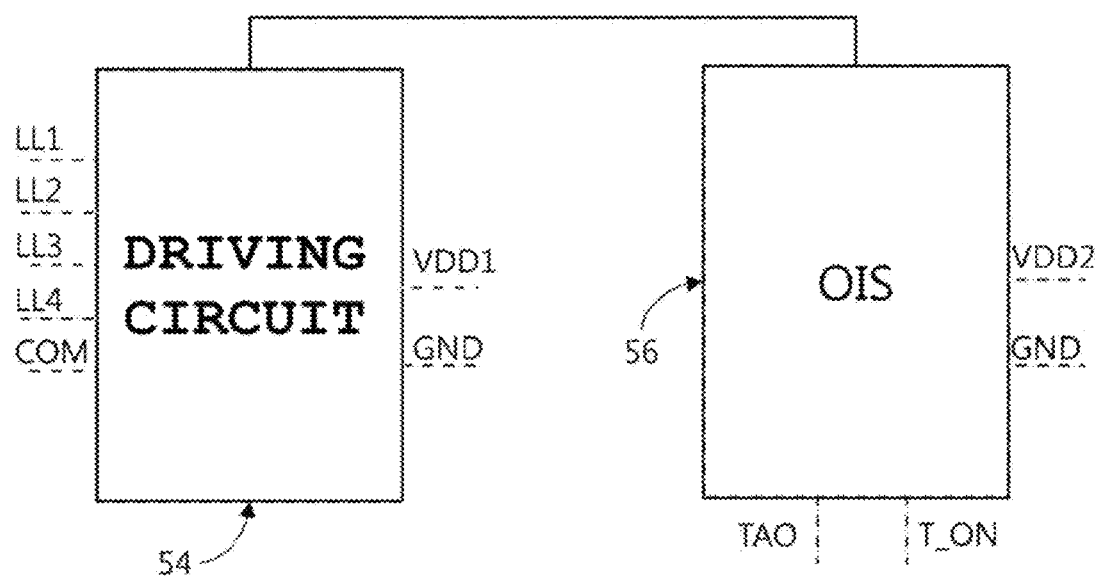
[FIG. 14]
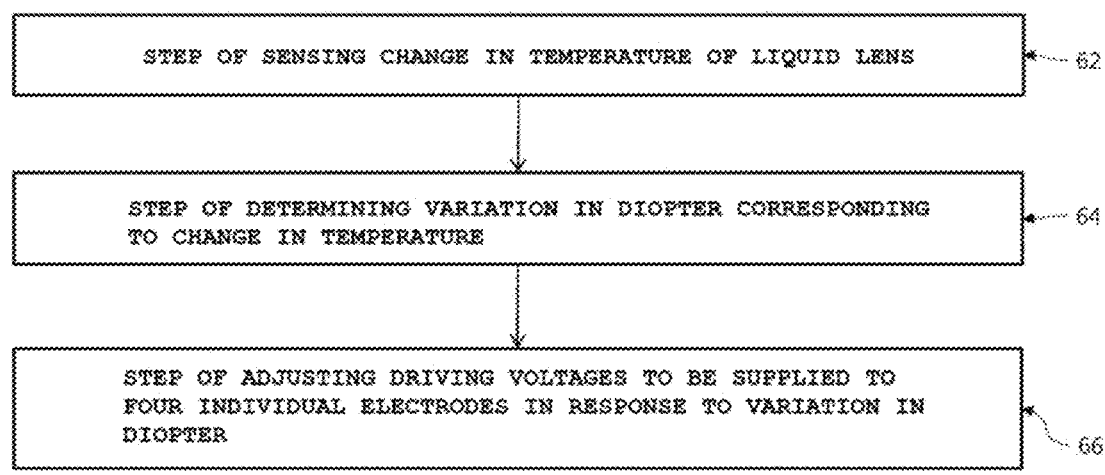

[FIG. 15a]
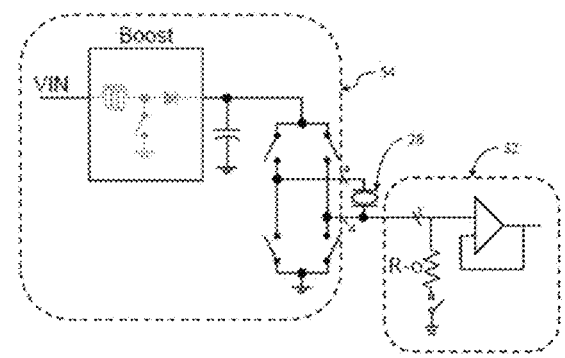
[FIG. 15b]
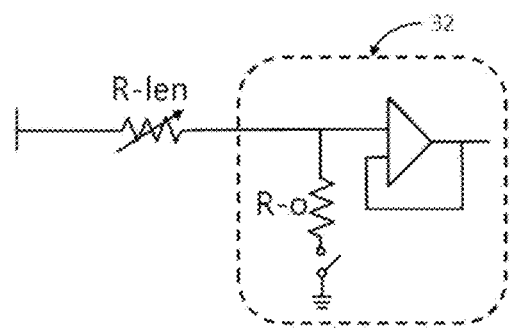
[FIG. 15c]
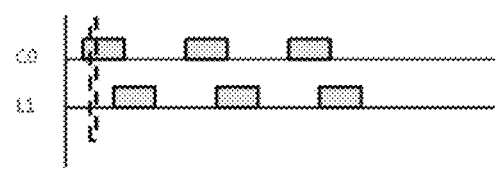

[FIG. 16a]
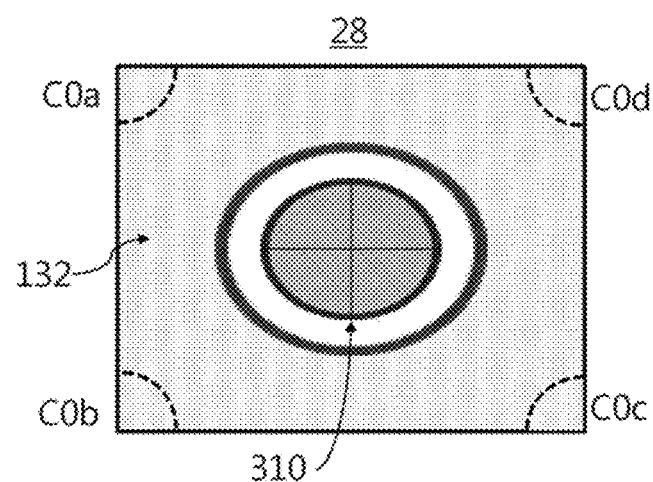
[FIG. 16b]
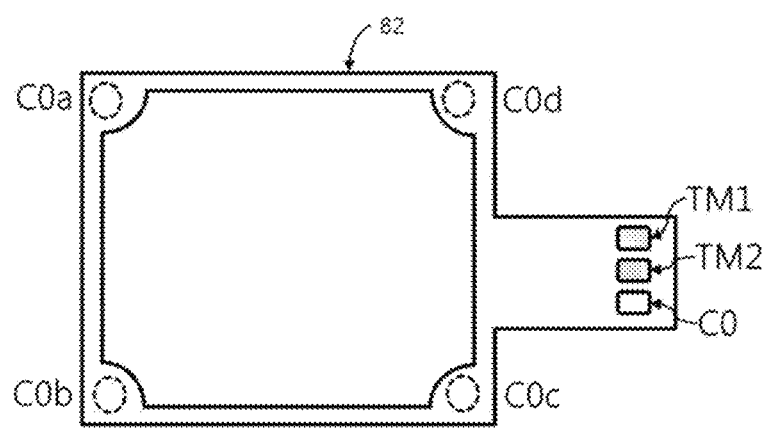

[FIG. 16c]
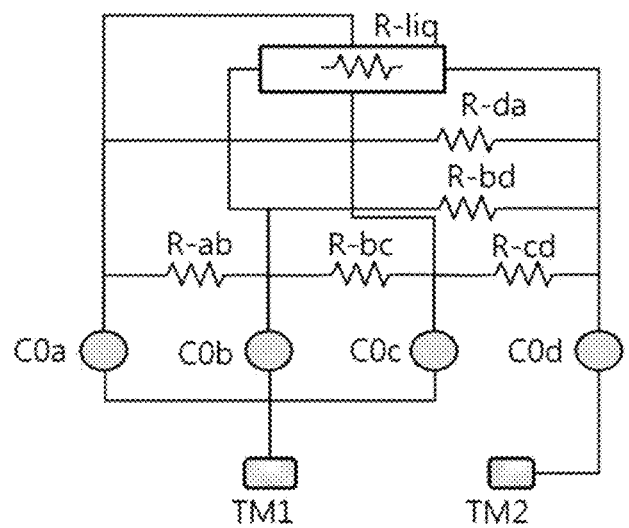
[FIG. 17a]
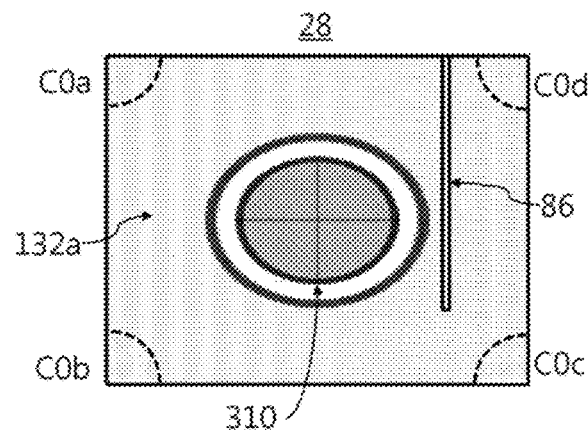

【FIG. 17b】
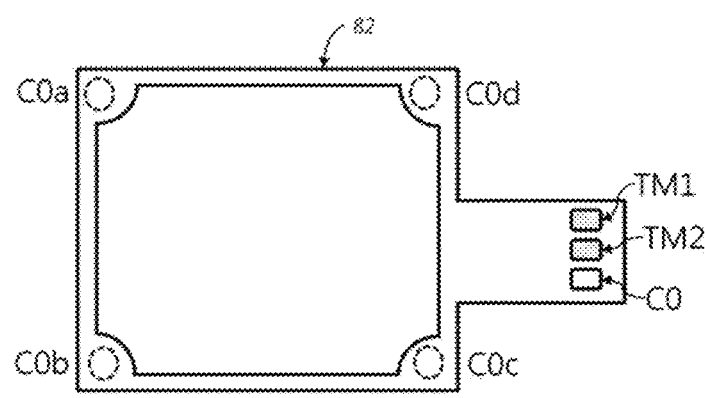
【FIG. 17c】
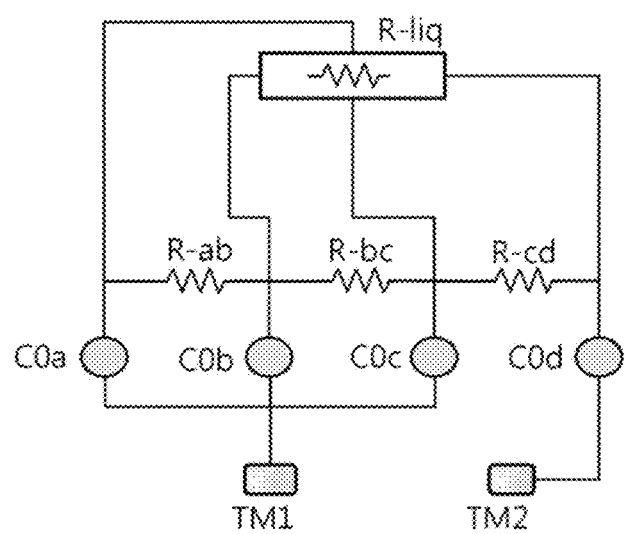

LIQUID LENS, LIQUID LENS MODULE INCLUDING THE LENS, CAMERA MODULE INCLUDING THE SAME, AND METHOD FOR CONTROLLING THE LENS

CROSS REFERENCE TO RELATED APPLICATIONS

This application is the National Phase of PCT International Application No. PCT/KR2018/001086, filed on Jan. 24, 2018, which claims priority under 35 U.S.C. 119(a) to Patent Application No. 10-2017-0011346, filed in Republic of Korea on Jan. 24, 2017 and Patent Application No. 10-2017-0047064, filed in Republic of Korea on Apr. 11, 2017, all of which are hereby expressly incorporated by reference into the present application.

TECHNICAL FIELD

The present disclosure relates to a liquid lens, a liquid lens module including the lens, a camera module including the same, and a method for controlling the same. More particularly, the present disclosure relates to a liquid lens enabling adjustment of a focal length using electrical energy and a camera module including the same.

BACKGROUND ART

People who use portable devices demand optical devices that have high resolution, are small, and have various photographing functions (an optical zoom-in/zoom-out function, an autofocus (AF) function, a hand-tremor compensation or optical image stabilization (OIS) function, etc.). Such photographing functions may be realized by directly moving a plurality of lenses that are combined. In the case in which the number of lenses is increased, however, the size of an optical device may be increased. The autofocus and hand-tremor compensation functions are performed by tilting or moving a lens module including a plurality of lenses, which are fixed to a lens holder in the state in which the optical axes of the lenses are aligned, along the optical axis or in a direction perpendicular to the optical axis. An additional lens moving apparatus is used to move the lens module. However, the lens moving apparatus consumes a lot of power, and an additional cover glass needs to be provided separately from the camera module in order to protect the lens moving apparatus, thus leading to an increase in the overall thickness of an optical device. Therefore, research has been conducted on a liquid lens configured to electrically adjust the curvature of an interface between two kinds of liquid in order to perform autofocus and hand-tremor compensation functions.

DISCLOSURE

Technical Problem

The present disclosure may provide a camera module including a lens enabling adjustment of the location of an interface between two liquids using electrical energy, a lens-driving circuit, and a lens control method capable of compensating for a change in diopter due to the deformation of the interface that occurs according to a change in the temperature of a structure containing the two liquids included in the lens.

In addition, the present disclosure may provide a liquid lens enabling adjustment of a degree of curvature or bias of an interface formed by two liquids included in the lens in response to the supply voltage and capable of preventing deterioration in the resolution of the lens due to thermal expansion in response to a change in temperature, a lens assembly including the liquid lens, and a camera module.

In addition, the present disclosure may provide a liquid lens including a temperature sensor disposed in a region adjacent to a cavity accommodating two liquids therein, a lens assembly including the liquid lens, and a camera module.

In addition, the present disclosure may provide a liquid lens including an electrode structure capable of sensing a change in the temperature of two liquids of the liquid lens and compensating for a change in diopter corresponding to the change in temperature, a lens assembly including the liquid lens, and a camera module.

In addition, the present disclosure may provide a control circuit or a driving circuit outputting a driving voltage so as to respond to a change in diopter that needs to be compensated for in response to a change in temperature that is fed back from a liquid lens of a camera module or from a lens assembly including the liquid lens.

In addition, the present disclosure may provide a camera module capable of outputting a driving voltage that enables more accurate recognition of a change in diopter that needs to be compensated for in response to a change in temperature so as to correspond to the structure of an electrode capable of directly sensing the change in the temperature of a liquid contained in a liquid lens of the camera module.

However, the objects to be accomplished by the disclosure are not limited to the above-mentioned objects, and other objects not mentioned herein will be clearly understood by those skilled in the art from the following description.

Technical Solution

In one embodiment, a camera module may include a liquid lens including a first plate including a cavity in which a conductive liquid and a non-conductive liquid are disposed, a common electrode disposed on the first plate, individual electrodes disposed under the first plate, a second plate disposed on the first electrode, and a third plate disposed under the second electrode, a lens holder accommodating the liquid lens and a solid lens therein, a sensor substrate on which an image sensor is disposed, the sensor substrate being disposed under the lens holder, a control unit disposed on the sensor substrate, the control unit controlling a voltage to be applied to the common electrode and the individual electrodes, a connection unit electrically connecting the individual electrodes or the common electrode to the sensor substrate, and a temperature sensor disposed on the connection unit, wherein the lens holder may include a recess in which the temperature sensor is disposed.

In addition, the liquid lens may include a lens region, in which the conductive liquid and the non-conductive liquid are disposed, and a rib region surrounding the lens region, and the temperature sensor may be disposed on or under the rib region.

In addition, the connection unit may include a first terminal part connected to the liquid lens and a second terminal part connected to the sensor substrate, the second terminal part may include a voltage supply terminal electrically connected to the liquid lens and a sensor terminal electrically connected to the temperature sensor, and the sensor substrate may include a first sensor terminal connected to the voltage supply terminal and a second sensor terminal connected to the temperature sensor.

In addition, the connection unit may include a first flexible printed circuit board transmitting a driving voltage to each of the individual electrodes and a second flexible printed circuit board connecting the common electrode to a ground voltage, and the first flexible printed circuit board and the second flexible printed circuit board may be located at opposite sides of the lens region.

In addition, the connection unit may transmit the change in temperature output from the temperature sensor, and may transmit the driving voltage and the activation signal of the temperature sensor.

In addition, the temperature sensor may output the change in temperature in the form of a 12-bit digital signal.

In addition, the control unit may determine different driving voltages for respective ones of the individual electrodes in order to perform a compensation operation for optical image stabilization (OIS).

In addition, the camera module may further include a gyro sensor configured to sense the movement of the camera module and to output a sensing signal corresponding to the movement, and the control circuit may determine the level of the driving voltage in response to the sensing signal and the change in temperature.

In addition, the camera module may further include a storage unit configured to store variation in diopter corresponding to the change in temperature, and the control unit may recognize the variation in diopter corresponding to the change in temperature from the storage unit.

In another embodiment, a method of controlling a liquid lens, included in a camera module and including a common electrode and four individual electrodes to adjust an interface formed by two liquids, may include sensing a change in temperature of the liquid lens, determining variation in diopter corresponding to the change in temperature, and adjusting driving voltages to be supplied to the four individual electrodes in response to the variation in diopter.

In still another embodiment, an optical device may include a housing, a display unit disposed in the housing and outputting an image, and a camera module disposed in the housing and capturing an image, wherein the camera module may include a liquid lens including a first plate including a cavity in which a conductive liquid and a non-conductive liquid are disposed, a common electrode disposed on the first plate, individual electrodes disposed under the first plate, a second plate disposed on the first electrode, and a third plate disposed under the second electrodes, a lens holder accommodating the liquid lens and a solid lens therein, a sensor substrate on which an image sensor is disposed, the sensor substrate being disposed under the lens holder, a control unit disposed on the sensor substrate and controlling voltages to be applied to the common electrode and the individual electrodes, a connection unit electrically connecting the individual electrodes or the common electrode to the sensor substrate, and a temperature sensor disposed on the connection unit, wherein the lens holder may include a recess in which the temperature sensor is disposed.

In still another embodiment, a camera module may include a liquid lens including a first plate including a cavity in which a conductive liquid and a non-conductive liquid are disposed, a common electrode disposed on the first plate, individual electrodes disposed under the first plate, a second plate disposed on the common electrode, and a third plate disposed under the individual electrodes, a lens holder accommodating the liquid lens and a solid lens therein, a sensor substrate on which an image sensor is disposed, the sensor substrate being disposed under the lens holder, a control unit disposed on the sensor substrate and controlling voltages to be applied to the common electrode and the individual electrodes, and a connection unit electrically connecting the individual electrodes or the common electrode to the sensor substrate, wherein the control unit may sense a change in resistance of the common electrode of the liquid lens and may control driving voltages to be supplied between the common electrode and the individual electrodes.

In addition, the connection unit may include at least two terminals electrically connected to the common electrode. One of the at least two terminals may include a plurality of contact regions with the common electrode, and the other terminal may include at least one contact region with the common electrode. The change in the resistance of the common electrode may be sensed through the at least two terminals.

In addition, the control unit may reduce the driving voltage when the temperature of the liquid lens increases from room temperature to a specific temperature.

In addition, the change in the resistance of the common electrode may be sensed by measuring the change in the resistance of the common electrode in the state in which the driving voltage is prevented from being applied to the common electrode.

In addition, the measured change in resistance may be in the range of greater than 0 and less than 10 microohms ($\mu\Omega$) or greater than 0 and less than 10 milliohms (m$\Omega$), and the voltage for sensing the change in resistance may have a level of 3 to 5 V or less.

In addition, one terminal may include three contact regions with the common electrode, and the other terminal may include a single contact region with the common electrode.

In addition, the common electrode may include a slit pattern, which is disposed adjacent to the single contact region of the other terminal. The slit pattern may be disposed adjacent to one of the multiple contact regions of one terminal.

In still another embodiment, a liquid lens may include a common electrode and a plurality of individual electrodes, wherein a first terminal forming a plurality of contact regions with the common electrode and a second terminal forming a single contact region with the common electrode may be disposed on the common electrode. The common electrode may include a slit pattern, which is disposed adjacent to the single contact region, which contacts the second terminal.

In addition, the common electrode may include a slit (groove) pattern, which is disposed adjacent to two of the multiple contact regions.

However, the above aspects of the present disclosure are only a part of the exemplary embodiments of the present disclosure, and various embodiments based on technical features of the present disclosure may be devised and understood by those skilled in the art from the following detailed description of the present disclosure.

Advantageous Effects

The effects of a device according to the disclosure will be described below.

The present disclosure may provide a control circuit and a control method capable of compensating for a change in diopter corresponding to a change of the temperature of a liquid lens even when a camera module does not include a separate temperature sensor for sensing a change in the temperature of the liquid lens in the camera module.

In addition, the present disclosure may provide a camera module including a liquid lens enabling adjustment of a focal length using an interface formed by two different liquids and capable of adjusting the curvature and the shape of the interface that may be deformed depending on a temperature, thereby reducing a temperature-dependent distortion coefficient in a lens assembly, which includes a plurality of lenses including the liquid lens, and consequently facilitating distortion correction.

In addition, the present disclosure is capable of reducing a temperature-dependent distortion coefficient in a lens assembly, which includes a plurality of lenses including a liquid lens, and consequently improving an autofocus (AF) function and an optical image stabilization (OIS) function of a camera module.

However, the effects achievable through the disclosure are not limited to the above-mentioned effects, and other effects not mentioned herein will be clearly understood by those skilled in the art from the following description.

DESCRIPTION OF DRAWINGS

FIG. 1 illustrates a camera module.

FIG. 2 illustrates a lens assembly including a liquid lens.

FIGS. 3*a* and 3*b* illustrate the liquid lens.

FIG. 4 illustrates the structure of the liquid lens.

FIGS. 5*a* and 5*b* illustrate a reason why the diopter of the liquid lens is changed in response to a change in temperature.

FIGS. 6*a* and 6*b* illustrate variation in the diopter of the liquid lens in response to a change in temperature.

FIGS. 7*a* and 7*b* illustrate a method of measuring a change in the spatial frequency response of the liquid lens in response to a change in temperature.

FIGS. 8*a* and 8*b* illustrate a change in the spatial frequency response of the liquid lens in response to a change in temperature.

FIG. 9 illustrates the determination of a compensation value of the liquid lens in response to a change in temperature.

FIG. 10 illustrates a camera module, which compensates for a change in diopter corresponding to a change in temperature.

FIG. 11 illustrates the camera module.

FIG. 12 illustrates a first example of a temperature sensor disposed in the liquid lens.

FIG. 13 illustrates a control circuit, which is interlocked with the temperature sensor shown in FIG. 12.

FIG. 14 illustrates a method of controlling the liquid lens.

FIGS. 15*a* to 15*c* illustrate a second example of the temperature sensor in the camera module for measuring the temperature in the liquid lens.

FIGS. 16*a* to 16*c* illustrate a first example of a liquid lens module.

FIGS. 17*a* to 17*c* illustrate a second example of the liquid lens module.

BEST MODE

Reference will now be made in detail to the preferred embodiments, examples of which are illustrated in the accompanying drawings. While the disclosure is subject to various modifications and alternative forms, specific embodiments thereof are shown by way of example in the drawings. However, the disclosure should not be construed as being limited to the embodiments set forth herein, but on the contrary, the disclosure covers all modifications, equivalents, and alternatives falling within the spirit and scope of the embodiments.

It may be understood that, although the terms "first", "second", etc. may be used herein to describe various elements, these elements are not to be limited by these terms. These terms are generally only used to distinguish one element from another. In addition, terms particularly defined in consideration of the construction and operation of the embodiments are used only to describe the embodiments, but do not define the scope of the embodiments.

In the following description of the embodiments, it will be understood that, when each element is referred to as being "on" or "under" another element, it can be "directly" on or under another element or can be "indirectly" formed such that an intervening element is also present. In addition, when an element is referred to as being "on" or "under", "under the element" as well as "on the element" may be included based on the element.

In addition, relational terms, such as "on/upper part/above" and "under/lower part/below", are used only to distinguish between one subject or element and another subject or element without necessarily requiring or involving any physical or logical relationship or sequence between such subjects or elements.

FIG. 1 illustrates an example of a camera module (or, camera apparatus).

As illustrated, the camera module may include a lens assembly 22 and an image sensor 26. The lens assembly 22 may include a liquid lens, the focal length of which is adjusted in response to the voltage applied thereto. The camera module may include a lens assembly 22, which includes a plurality of lenses including a first lens, the focal length of which is adjusted in response to the driving voltage applied between a common terminal and a plurality of individual terminals, a control circuit 24 for supplying a driving voltage to the first lens, and an image sensor 26, which is aligned with the lens assembly 22 and converts the light transmitted through the lens assembly 22 into an electrical signal.

Referring to FIG. 1, the camera module may include circuits 24 and 26, disposed on a single printed circuit board (PCB), and a lens assembly 22, including a plurality of lenses. However, this is merely illustrative, and the scope of the disclosure is not limited thereto. The control circuit 24 may be designed differently in accordance with the specifications required for a camera module. In particular, in order to reduce the intensity of the voltage applied to a liquid lens 28, the control circuit 24 may be implemented as a single chip. As a result, it is possible to further reduce the size of a camera module that is mounted in a portable device.

FIG. 2 illustrates an example of the lens assembly 22 included in the camera module. Referring to FIG. 2, the lens assembly 22 may include a first lens unit 100, a second lens unit 200, a liquid lens unit 300, a lens holder 400, and a connection unit 500. The connection unit 500 may electrically connect the image sensor and the liquid lens to each other, and may include a substrate, a wire, or a cable, which will be described later. The illustrated structure of the lens assembly 22 is just one example, and the structure of the lens assembly 22 may be changed depending on the specifications required for the camera module. In the illustrated example, the liquid lens unit 300 is disposed between the first lens unit 100 and the second lens unit 200. However, in another example, the liquid lens unit 300 may be disposed on the first lens unit 100 (or on the front surface of the first lens unit), and one of the first lens unit 100 or the second lens unit 200 may be omitted. The configuration of the control circuit 24 may be designed differently in accordance with the specifications required for the camera module. In particular, in order to reduce the intensity of the operating voltage applied to the lens assembly 22, the control circuit 24 may be implemented as a single chip. As a result, it is possible to further reduce the size of the camera module that is mounted in a portable device.

As illustrated, the lens assembly 22 may include a first lens unit 100, a second lens unit 200, a liquid lens unit 300, a lens holder 400, and a connection unit 500. The connection unit 500 may electrically connect the image sensor and the liquid lens to each other, and may include a substrate, a wire, or a cable, which will be described later. The illustrated structure of the lens assembly 22 is just one example, and the structure of the lens assembly 22 may be changed depending on the specifications required for the camera module. In the illustrated example, the liquid lens unit 300 is disposed between the first lens unit 100 and the second lens unit 200. However, in another example, the liquid lens unit 300 may be disposed on the first lens unit 100 (or on the front surface of the first lens unit), and one of the first lens unit 100 or the second lens unit 200 may be omitted.

Referring to FIG. 2, the first lens unit 100 is disposed at the front side of the lens assembly, and receives light incident from the outside of the lens assembly. The first lens unit 100 may include at least one lens, or two or more lenses may be aligned along a center axis PL to form an optical system.

The first lens unit 100 and the second lens unit 200 may be mounted in the lens holder 400. Here, a through-hole may be formed in the lens holder 400, and the first lens unit 100 and the second lens unit 200 may be disposed in the through-hole. Further, the liquid lens unit 300 may be inserted into the space between the first lens unit 100 and the second lens unit 200 in the lens holder 400.

Meanwhile, the first lens unit 100 may include a solid lens 110. The solid lens 110 may protrude so as to be exposed outside the lens holder 400. In the case in which the solid lens is exposed to the outside, the surface thereof may be damaged. If the lens surface is damaged, the quality of an image captured by the camera module may be deteriorated. In order to prevent or suppress damage to the surface of the solid lens 110, a method of disposing a cover glass, a method of forming a coating layer, or a method of forming the solid lens 110 using a wear-resistant material for preventing damage to the surface of the solid lens may be applied.

The second lens unit 200 may be disposed at the rear of the first lens unit 100 and the liquid lens unit 300, and the light incident on the first lens unit 100 from the outside may pass through the liquid lens unit 300 and may be incident on the second lens unit 200. The second lens unit 200 may be spaced apart from the first lens unit 100, and may be disposed in the through-hole formed in the lens holder 400.

Meanwhile, the second lens unit 200 may include at least one lens, and when two or more lenses are included, the lenses may be aligned along the center axis PL to form an optical system.

The liquid lens unit 300 may be disposed between the first lens unit 100 and the second lens unit 200, and may be inserted into an insertion hole 410 formed in the lens holder 400. The insertion hole 410 may be formed such that a portion of the side surface of the lens holder is open. That is, the liquid lens may be inserted and disposed in the holder through the insertion hole 410 formed in the side surface of the holder. The liquid lens unit 300 may also be aligned along the center axis PL in the same manner as the first lens unit 100 and the second lens unit 200.

The liquid lens unit 300 may include a lens region 310. The lens region 310 may be a region that light that has passed through the first lens unit 100 penetrates, and may contain a liquid in at least a portion thereof. For example, two kinds of liquid, i.e. a conductive liquid and a non-conductive liquid, may be contained in the lens region 310, and the conductive liquid and the non-conductive liquid may form an interface therebetween without being mixed with each other. The interface between the conductive liquid and the non-conductive liquid may be deformed by a driving voltage applied thereto through the connection unit 500, whereby the curvature of the interface of the liquid lens 28 or the focal length of the liquid lens may be changed. When deformation of the interface and the change in the curvature thereof are controlled, the liquid lens unit 300 and the camera module including the same may perform an autofocus function, a hand-tremor compensation function, etc.

FIG. 3 illustrates the liquid lens, the focal length of which is adjusted in response to a driving voltage. Specifically, FIG. 3*a* illustrates a first lens 28 included in the lens assembly 22 (refer to FIG. 2), and FIG. 3*b* illustrates an equivalent circuit of the lens 28.

First, referring to FIG. 3*a*, the lens 28, the focal length of which is adjusted in response to a driving voltage, may receive a voltage through individual terminals L1, L2, L3 and L4, which are disposed at the same angular interval from each other in four different directions. The individual terminals may be disposed at the same angular interval from each other with respect to the center axis of the liquid lens, and may include four individual terminals. The four individual terminals may be respectively disposed at the four corners of the liquid lens. When the voltage is applied through the individual terminals L1, L2, L3 and L4, the interface between the conductive liquid and the non-conductive liquid disposed in the lens region 310 may be deformed by the driving voltage, which is generated by interaction between the voltage applied to the individual terminals and the voltage applied to a common terminal C0, which will be described later.

Further, referring to FIG. 3*b*, the lens 28 may be defined as a plurality of capacitors 30, one side of each of which receives an operating voltage from a corresponding one of the respectively different individual terminals L1, L2, L3 and L4, and the other side of each of which is connected to the common terminal C0. Here, the capacitors 30 included in the equivalent circuit may have a low capacitance of about several tens to 200 picofarads (pF). In this specification, the above-described terminal of the liquid lens may be referred to as an electrode sector or a sub-electrode.

FIG. 4 illustrates the structure of the liquid lens.

As illustrated, the liquid lens 28 may include liquids, a first plate, and electrodes. The liquids 122 and 124 included in the liquid lens 28 may include a conductive liquid and a non-conductive liquid. The first plate may include a cavity 150 or a hole in which the conductive liquid and the non-conductive liquid are disposed. The cavity 150 may include an inclined surface. The electrodes 132 and 134 may be disposed on the first plate 114, or may be disposed under the first plate 114. The liquid lens 28 may further include a second plate 112, which may be disposed on (or under) the electrodes 132 and 134. In addition, the liquid lens 28 may further include a third plate 116, which may be disposed under (or on) the electrodes 132 and 134. As illustrated, one embodiment of the liquid lens 28 may include an interface 130 formed by two different liquids 122 and 124. In addition, the liquid lens 28 may include at least one substrate 142 and 144, which supplies a voltage to the liquid lens 28. The corners of the liquid lens 28 may be thinner than the center portion of the liquid lens 28. The second plate may be disposed on the upper surface of the liquid lens, and the third plate may be disposed on the lower surface of the liquid lens. However, the second plate or the third plate may not be disposed on a portion of the upper surface or the lower surface of the corners of the liquid lens, and thus the corners of the liquid lens may be thinner than the center portion of the liquid lens. The electrodes may be exposed on the upper surface or the lower surface of the corners of the liquid lens.

The liquid lens 28 may include two different liquids, namely the conductive liquid 122 and the non-conductive liquid 124, and the curvature and the shape of the interface 130 formed by the two liquids may be adjusted by varying the driving voltage supplied to the liquid lens 28. The driving voltage supplied to the liquid lens 28 may be transmitted through the connection unit 500. The connection unit may include at least one of the first substrate 142 or the second substrate 144. In the case in which the connection unit includes the first substrate 142 and the second substrate 144, the second substrate 144 may serve to transmit a voltage to each of the individual terminals, and the first substrate 142 may serve to transmit a voltage to the common terminal. Four individual terminals may be provided, and the second substrate 144 may transmit a voltage to each of the four individual terminals. The voltages supplied through the second substrate 144 and the first substrate 142 may be applied to a plurality of electrodes 134 and 132 disposed or exposed at the respective corners of the liquid lens 28. The connection unit may include at least two terminals, which are electrically connected to the common electrode. One of the at least two terminals may include a plurality of contact regions with the common electrode, and the other terminal may include at least one contact region with the common electrode. The change in the resistance of the common electrode may be sensed through the at least two terminals.

One terminal may include three contact regions with the common electrode, and the other terminal may include a single contact region with the common electrode.

In addition, the liquid lens 28 may include a third plate 116 and a second plate 112, which include a transparent material, and may further include a first plate 114, which is disposed between the third plate 116 and the second plate 112 and includes an open region having a predetermined inclined surface.

In addition, the liquid lens 28 may include a cavity 150, which is defined by the third plate 116, the second plate 112, and the open region in the first plate 114. Here, the cavity 150 may be filled with two liquids 122 and 124 having different properties (e.g. a conductive liquid and a non-conductive liquid), and an interface 130 may be formed between the two liquids 122 and 124 having different properties.

Further, at least one of the two liquids 122 and 124 included in the liquid lens 28 may be conductive, and the liquid lens 28 may include two electrodes 132 and 134, which are disposed on and under the first plate 114. The first plate 114 may include an inclined surface, and may further include an insulation layer 118, which is disposed on the inclined surface. The conductive liquid may be in contact with the insulation layer. Here, the insulation layer 118 may cover one (e.g. the second electrode 134) of the two electrodes 132 and 134, and may cover or expose a portion of the other one (e.g. the first electrode 132) of the two electrodes 132 and 134 so that electrical energy is applied to the conductive liquid (e.g. 122). Here, the first electrode 132 may include at least one electrode sector (e.g. C0), and the second electrode 134 may include two or more electrode sectors (e.g. L1, L2, L3 and L4 in FIG. 4). For example, the second electrode 134 may include a plurality of electrode sectors, which are sequentially disposed in the clockwise direction about the optical axis. The electrode sectors may be referred to as sub-electrodes or terminals of the liquid lens.

One or two or more substrates 142 and 144 may be connected to the two electrodes 132 and 134 included in the liquid lens 28 in order to transmit a voltage thereto. The curvature, flexure, or inclination of the interface 130 formed in the liquid lens 28 may be changed in response to the driving voltage, whereby the focal length of the liquid lens 28 may be adjusted.

FIGS. 5a and 5b illustrate a reason why the diopter of the liquid lens is changed in response to a change in temperature. Specifically, FIG. 5a illustrates the liquid lens at room temperature, and FIG. 5b illustrates the liquid lens at a high temperature.

As described above, the cavity, which is defined by a first layer 12, an intermediate layer 14, and a second layer 16, is filled with two liquids having different properties. The intermediate layer 14 may be referred to as a first plate, the first layer 12 may be referred to as a second plate, and the second layer 16 may be referred to as a third plate. The intermediate layer 14 may include the cavity in which the conductive liquid and the non-conductive liquid are disposed. The liquids in the liquid lens expand with an increase in temperature (e.g. thermal expansion).

The two liquids charged in the cavity may include an electrolytic (or conductive) liquid and a non-electrolytic (or non-conductive) liquid. The degree of thermal expansion of a liquid may be larger than that of a solid. As the temperature of a material increases, the movement of molecules becomes more active, and the distance between the molecules increases, which may result in an increase in the volume of the material. In particular, since molecules of a liquid move more freely than molecules of a solid, a liquid may thermally expand more than a solid for the same change in temperature. A representative example of an electrolytic (conductive) liquid used in a liquid lens is water ($H_2O$). In the case of water, the volume thereof increases when the temperature rises within the range of 4° C. or higher, but the volume thereof decreases when the temperature rises within the range below 4° C. The coefficient of thermal expansion of water is known to be about 1.8 (unit: $10^{-5}/°$ C.).

Referring to FIG. 5a, if there is no change in the volume of the two liquids in the cavity at room temperature, the light incident through the first layer 12 may be refracted by the interface 30 formed by the two liquids in the cavity, and may pass through the second layer 16. In this case, it is possible to control the liquid lens in a desired direction by applying electric energy to the liquid lens to change the curvature of the interface 30.

Referring to FIG. 5b, the first layer 12 or the second layer 16 may swell due to a change in the volume of the two liquids in the cavity at a high temperature. Since the center portion and the peripheral region of the first layer 12 are not bonded to the intermediate layer 14 and the thickness of the center portion is relatively small, the first layer 12 may bend in response to the increase in the volume of the two liquids due to a change in temperature. For example, the first layer 12 may swell to about 20 mm, and at this time, the variation in diopter may be about 4.7.

Despite the change in temperature, the second layer 16 may swell less than the first layer 12, or may not swell, due to the difference in the thickness and the contact area with the liquids between the first layer 12 and the second layer 16.

After the intermediate layer 14, on which a plurality of electrode patterns is disposed, is secured on the second layer 16, an insulation layer (not shown) may be formed so as to prevent the electrode patterns from being exposed to the cavity. For example, one of two electrode patterns may be covered with the insulation layer, and only the other one may be exposed, thereby preventing the properties of the two liquids in the cavity from being changed. Due to the insulation layer formed on the intermediate layer 14 and the second layer 16, even when the two liquids thermally expand in response to a change in temperature, the second layer 16 may swell less than the first layer 12, and the first layer 12, which has low rigidity, may swell more than the second layer 16.

When the first layer 12 swells, light incident through the first layer 12 may be refracted by the curvature generated in the first layer 12, separately from the interface 30, the curvature of which is controlled using electrical energy. In this case, the curvature generated in the first layer 12 may not be considered when designing the liquid lens. Even when the coefficients of thermal expansion of the two liquids according to a change in temperature are accurately known, uniform curvature of the first layer 12 may not be generated. For example, depending on the bonding strength between the first layer 12 and the intermediate layer 14, the portion having the lower strength may swell first. As described above, the first layer 12, which is not maintained uniform, may cause a change in the diopter of the liquid lens according to a change in temperature, which may make it difficult to accurately predict the change in diopter.

FIGS. 6a and 6b illustrate variation in the diopter of the liquid lens in response to a change in temperature. Specifically, FIGS. 6a and 6b illustrate the results of tracking the changes in the diopter of the liquid lenses, which have predetermined focal lengths set for different operating environments or operating purposes, in response to a change in temperature.

Referring to FIGS. 6a and 6b, the liquid lenses may have different diopter values depending on the level of the driving voltage applied thereto. However, even when the same driving voltage is applied, it can be seen that the diopter varies in response to a change in temperature (an increase from about 25 degrees Celsius to 40 degrees Celsius). As can be seen from the case of the two liquid lenses, variation in diopter is proportional to an increase in temperature within an ordinary temperature range.

However, variation in diopter may not be proportional to a change in temperature in the operating environment of a very low temperature or a very high temperature. As described with reference to FIGS. 5a and 5b, variation in diopter may be associated with the coefficients of thermal expansion of the two liquids included in the liquid lens. Further, other complex factors such as the elasticity and the coupling strength of the transparent layers forming the liquid lens may also have an influence on variation in diopter corresponding to a change in temperature. Thus, variation in diopter corresponding to a change in temperature may be measured through a lens calibration process, and data related thereto may be stored in the control circuit.

FIGS. 7a and 7b illustrate a method of measuring a change in the spatial frequency response of the liquid lens in response to a change in temperature. Specifically, FIG. 7a illustrates a chart for measuring the spatial frequency response (SFR) at a long-distance focal point, and FIG. 7b illustrates a chart for measuring the spatial frequency response (SFR) at a short-distance focal point.

The camera module receives light through an external filter, and acquires an image in RGB form through the image sensor. Describing the image acquisition using a sensor of the camera module in terms of frequency, the spatial frequency spectra of an image to be acquired may be repeated in a two-dimensional plane having an x-axis and a y-axis. In order to measure the optical characteristics of the liquid lens, the distance between the liquid lens and the chart shown in FIG. 7a or 7b may be set to a predetermined value, and an image with respect to the chart may be acquired using the liquid lens.

In order to analyze the resolution of a camera module or a liquid lens, the spatial frequency response (SFR) of the camera module or the liquid lens may be measured. Here, the spatial frequency response is an index indicating the relationship between the input spatial frequency and the responsiveness of a digital camera, and is represented by a change in modulation transfer function (MTF) in response to an increase in spatial frequency. Here, the modulation transfer function (MTF) represents the reproduction ratio of the contrast, i.e. the ratio of the output contrast Ro to the input contrast Ri (MTF=Ro/Ri).

The spatial frequency of each pattern in the resolution chart shown in FIGS. 7a and 7b may indicate how many patterns are repeated for each predetermined interval (e.g. 1 mm) (e.g. unit: cycles/mm). It is possible to numerically display the accuracy with which the resolution chart projected through the lens reproduces the original resolution chart using the modulation transfer function (MTF). On the assumption that the spatial frequency response (SFR) obtained in the above manner has a numerical range of 0 to 100, when the spatial frequency response (SFR) of the liquid lens exceeds a predetermined value in accordance with the performance of the lens required for the camera module, the liquid lens is capable of being applied to the camera module.

However, as described with reference to FIGS. 5a, 5b, 6a and 6b, since the spatial frequency response (SFR) of the liquid lens varies in accordance with a change in temperature, the liquid lens needs to be adjusted in response to a change in temperature in order to be applied to a camera module.

FIGS. 8a and 8b illustrate a change in the spatial frequency response (SFR) of the liquid lens in response to a change in temperature. When power is supplied to the camera module, the temperature of the camera module may increase due to various factors that generate heat in the camera module. Here, the change in spatial frequency response (SFR) is measured under conditions in which the temperature of the liquid lens is increased from room temperature (about 23 degrees Celsius) to a high temperature (about 50 degrees Celsius) over time.

FIG. 8a illustrates a change in the spatial frequency response 74a of the liquid lens in response to a change in the temperature 72 of the liquid lens when the driving voltage supplied to the liquid lens is not adjusted. The temperature in the camera module may increase over time, and the increase in the temperature in the camera module may increase the temperature of the liquid lens. As illustrated, as the temperature 72 increases, the spatial frequency response 74a of the liquid lens may be lowered. Before the temperature 72 increases (time: 0 seconds), the spatial frequency response 74a is about 60. When more than 30 minutes have elapsed (when the temperature increases), the spatial frequency response 74a is lowered to about 45.

FIG. 8b illustrates a change in the spatial frequency response (SFR) of the liquid lens in response to a change in the temperature of the liquid lens when the driving voltage supplied to the liquid lens is lowered by about 1.44 V. For example, the control circuit, which is capable of controlling a driving voltage in response to 12-bit data corresponding to a temperature, may reduce the driving voltage by about 1.44 V by inputting 12-bit data, in which 32 codes are reduced, to the control circuit. As illustrated, when the temperature 72 of the liquid lens is room temperature, the spatial frequency response 72b is low, but as the temperature increases, the spatial frequency response (SFR) is increased. Before the temperature 72 increases (time: 0 seconds), the spatial frequency response 74a is about 55. When more than 30 minutes have elapsed (when the temperature increases), the spatial frequency response 74a is increased to about 63.

FIG. 9 illustrates the determination of a compensation value of the liquid lens in response to a change in temperature.

As illustrated, in order to compensate for the deterioration in the spatial frequency response (SFR) in response to a change in the temperature of the liquid lens, the two cases described with reference to FIGS. 8a and 8b may be combined. That is, in order to provide an improved spatial frequency response (SFR) at a specific time point A, the liquid lens may be controlled by selectively applying the case 74a in which the driving voltage is not adjusted or the case 74b in which the driving voltage is adjusted by a predetermined value (about 1.44 V).

Here, the specific time point A may be a time point at which a predetermined time period has elapsed since the start of a predetermined operation. For example, the predetermined time period may be about 520 seconds. That is, the specific time point A, at which the spatial frequency response (SFR) in the case 74a in which the driving voltage is not adjusted and the spatial frequency response (SFR) in the case 74b in which the driving voltage is adjusted by a predetermined value (about 1.44 V) become substantially equal to each other, is a time point at which 520 seconds have elapsed since the initial state. Meanwhile, the specific time point A may be the time point at which the temperature of the image sensor increases to about 40 to 45 degrees Celsius and the temperature of the liquid lens increases to a level corresponding thereto.

Depending on the embodiment, the start of the predetermined operation may be performed at the time point at which power is applied to the image sensor or the control unit. In another embodiment, the start of the predetermined operation may be performed at the time point at which the control circuit automatically focuses the lens on a specific object in the image obtained through the image sensor. The control unit may sense a change in the resistance of the common electrode of the liquid lens, and may control the driving voltage supplied between the common electrode and the individual electrodes. The control unit may reduce the driving voltage when the temperature of the liquid lens increases from room temperature to a specific temperature. The change in the resistance of the common electrode may be sensed by measuring the change in the resistance of the common electrode in the state in which the driving voltage is prevented from being applied to the common electrode. The measured change in resistance may be in the range of greater than 0 and less than 10 microohms (μΩ) or greater than 0 and less than 10 milliohms (mW), and the voltage for sensing the change in resistance may have a level of 3 to 5 V or less.

Meanwhile, the time point at which the predetermined operation starts may be determined as the time point at which the temperature of the liquid lens starts to increase. This may vary depending on the structure or shape of the camera module including the liquid lens.

The spatial frequency response (SFR) of the liquid lens may have a predetermined range B in response to a change in temperature at a specific time point A through a method of adjusting the driving voltage supplied to the liquid lens. For example, the spatial frequency response (SFR) may range from about 57 to 64. The spatial frequency response (SFR) of the liquid lens may have a predetermined range B, i.e. a small change, in response to a change in temperature, and thus the camera module including the liquid lens may realize a substantially uniform resolution despite a change in temperature.

FIG. 10 illustrates a camera module, which compensates for a change in diopter corresponding to a change in temperature.

As illustrated, the camera module may include a liquid lens 28, in which an interface 30 formed by two different liquids is controlled in response to the driving voltage applied to a plurality of individual electrodes, a temperature sensor 32 disposed adjacent to the interface 30 in order to sense a change in temperature, and a control circuit 24 for adjusting the level of the driving voltage in order to compensate for the change in temperature.

The liquid lens 28 may include a lens region in which the interface 30 is located and a rib region protecting the lens region. The temperature sensor 32 may be disposed at a position adjacent to the interface 30 of the liquid lens 28 in order to compensate for a change in diopter corresponding to a change in temperature. Depending on the embodiment, the temperature sensor 32 may be disposed in the rib region.

The temperature sensor 32 may be disposed at a position adjacent to the interface 30, may measure a change in temperature, and may output a 12-bit temperature data signal to the control circuit 24. Here, the control circuit 24 may determine different driving voltages for the respective individual electrodes in order to perform a compensation operation for optical image stabilization (OIS). At this time, the control circuit 24 may adjust the level of the driving voltage in response to the change in temperature transmitted from the temperature sensor 32.

In addition, the control circuit 24 may further include a gyro sensor (52) for sensing the movement of the camera module and outputting a sensing signal corresponding to the movement. The control circuit 24 may determine the level of the driving voltage in response to both the sensing signal and the change in temperature in order to perform a compensation operation for optical image stabilization (OIS).

Although not illustrated, the camera module may further include a connection unit (not shown), which connects the liquid lens 28 to the control circuit 24 and transmits a driving voltage. The connection unit may use a flexible printed circuit board (FPCB). The flexible printed circuit board (FPCB) may include not only at least one wire transmitting a driving voltage but also a simple circuit. Depending on the embodiment, the temperature sensor 32 may be disposed at the connection unit.

In addition, the control circuit 24 may further include a storage unit (not shown) for storing variation in diopter corresponding to a change in temperature. The control circuit 24 may recognize the variation in diopter corresponding to the change in temperature from the storage unit. At this time, the storage unit may be implemented as a nonvolatile memory device included in the control circuit 24, or may be implemented as an independent device that is interlocked with the control circuit 24. The variation in diopter corresponding to a change in temperature, which is stored in the storage unit, may be determined through lens calibration.

The camera module may further include a lens assembly 22, which includes a liquid lens 28 and at least one solid lens aligned with the liquid lens 28, and an image sensor 26 converting an optical signal transmitted through the lens assembly 22 into an electrical signal.

The image sensor 26 may output image data. A processing system or a computing device 40 may perform operations such as image processing, correction, and brightness adjustment based on the image data from the image sensor 26. Here, the processing system or the computing device 40 may transmit a control signal or a correction value for performing correction control to the control circuit 24. Here, the processing system or the computing device 40 may be included in a portable device, a computer, a vehicle, a server, or the like, which includes a camera module or is interlocked with a camera module. The control circuit 24 may generate the driving voltage corresponding to the correction control.

FIG. 11 illustrates the camera module.

As illustrated, the camera module may include a liquid lens 28, in which an interface 30 (refer to FIG. 3) formed by two different liquids is adjusted in response to the driving voltage applied to a plurality of individual electrodes, a temperature sensor 32 for sensing a change in the temperature in the liquid lens 28, and a control circuit 24 for adjusting the level of the driving voltage in order to compensate for the change in temperature. The control circuit 24 may be a control unit.

The temperature sensor 32 may measure the change in the temperature of the liquid lens 28, and may output a 12-bit temperature data signal to the control circuit 24. Here, the control circuit 24 may determine different driving voltages for the respective individual electrodes in order to perform a compensation operation for optical image stabilization (OIS). At this time, the control circuit 24 may adjust the level of the driving voltage in response to the change in temperature transmitted from the temperature sensor 32.

In addition, the control circuit 24 may further include a gyro sensor (not shown) for sensing the movement of the camera module and outputting a sensing signal corresponding to the movement. The control circuit 24 may determine the level of the driving voltage in response to both the sensing signal and the change in temperature in order to perform a compensation operation for optical image stabilization (OIS).

Although not illustrated, the camera module may further include a connection unit (not shown), which connects the liquid lens 28 to the control circuit 24 and transmits a driving voltage. The connection unit may use a flexible printed circuit board (FPCB). The flexible printed circuit board (FPCB) may include not only at least one wire transmitting a driving voltage but also a simple circuit. Depending on the embodiment, the temperature sensor 32 may be disposed at the connection unit.

In addition, the control circuit 24 may further include a storage unit (not shown) for storing variation in diopter corresponding to a change in temperature, voltage information, or code information. The control circuit 24 may recognize information about compensation in response to the change in temperature from the storage unit. The information about compensation may be information about a code value, voltage, or diopter. At this time, the storage unit may be implemented as a nonvolatile memory device included in the control circuit 24, or may be implemented as an independent device that is interlocked with the control circuit 24. The variation in diopter, the voltage, or the code, which is stored in the storage unit and needs to be adjusted in response to a change in temperature, may be determined through lens calibration.

The camera module may further include an image sensor 26 converting an optical signal transmitted through a lens assembly, which includes a liquid lens 28 and at least one solid lens aligned with the liquid lens 28, into an electrical signal.

The image sensor 26 may output image data. A processing system or a computing device 40 may perform operations such as image processing, correction, and brightness adjustment based on the image data from the image sensor 26. Here, the processing system or the computing device 40 may transmit a control signal or a correction value for performing correction control to the control circuit 24. Here, the processing system or the computing device 40 may be included in a portable device, a computer, a vehicle, a server, or the like, which includes a camera module or is interlocked with a camera module. The control circuit 24 may generate the driving voltage corresponding to the correction control.

Referring to FIG. 11, the camera module may include a liquid lens 28, a temperature sensor 32 for sensing the change in the temperature of the liquid lens 28, an image sensor 26 for converting an optical signal transmitted through the liquid lens 28 into image data, a processing system 40 for processing the data transmitted from the image sensor 26, and a control circuit 24 for controlling the liquid lens 28. Here, the image sensor 26 and the processing system 40 may transmit and receive data and control signals therebetween over serial communication, and the processing system 40 and the control circuit 24 may transmit and receive data and control signals therebetween over serial communication. For example, the above components may be connected to each other via a serial clock (SCL) line and a serial data (SDA) line for synchronization in order to realize serial communication.

The control circuit 24 may include a gyro sensor 52 for sensing the movement of the camera module, a driving circuit 54 for generating a driving voltage to be transmitted to the liquid lens 28, and an optical image stabilization controller 56 for determining a compensation value for optical image stabilization (OIS) and transmitting the compensation value to the driving circuit 54.

The gyro sensor 52 and the optical image stabilization controller 56 may be connected to each other via a serial peripheral interface bus (SPI bus). Here, the SPI bus is a synchronous serial data link standard named by Motorola architecture that operates in an architecture full duplex communication mode. Devices communicate in a master/slave mode, in which a master device initiates a data frame and multiple slave devices operate together with individual slave select (chip select) lines. The SPI bus may include a clock signal (SCLK, SCK/CLK) pin, a chip select signal (CS, FSS/SS) pin, a data input (MOST) pin, and a data output (MISO) pin.

The optical image stabilization controller 56 may recognize information about compensation from the storage device 58, which stores variation in diopter depending on a temperature based on 12-bit temperature data, and may transmit the information to the driving circuit 54 so as to generate a value corresponding to the information. The information about compensation may be information about a voltage, code, or diopter. Here, the storage device 58 may be included in the optical image stabilization controller 56, or may be independently provided so as to be interlocked with the optical image stabilization controller 56.

FIG. 12 illustrates a first example of the temperature sensor disposed in the liquid lens.

As illustrated, a plurality of electrodes LL1, LL2, LL3, LL4 and COM is exposed on the front and rear surfaces of the liquid lens 28, and the temperature sensor 32 is disposed on the front surface of the liquid lens 28. The temperature sensor 32 may not be disposed in the lens region, which is a cavity 310 in which an interface may be formed, but may be disposed on a peripheral region that protects the lens region. The driving voltages for controlling the interface of the lens are applied through the electrodes LL1, LL2, LL3, LL4 and COM, which are disposed at the four corners of the liquid lens 28. The liquid lens 28 may further include conductive patterns formed on regions other than the corners to supply power VDD and GND to the temperature sensor 32, to output temperature data TAO, which is the sensing result of the temperature sensor, and to transmit a control signal T_ON for turning the temperature sensor 32 on or off.

Although not illustrated, depending on the embodiment, the temperature sensor 32 may be disposed on the rear surface of the liquid lens 28, to which a common voltage COM is applied.

FIG. 13 illustrates the control circuit, which is interlocked with the temperature sensor shown in FIG. 12.

As illustrated, the control circuit may include the optical image stabilization controller 56 and the driving circuit 54. The optical image stabilization controller 56 may output a control signal T_ON to activate the temperature sensor (refer to FIG. 8), and may receive temperature data TAO transmitted from the temperature sensor 32. The optical image stabilization controller 56 may determine a compensation value corresponding to the temperature data, and may transmit the compensation value to the driving circuit 54. The driving circuit 54 may output driving voltages LL1, LL2, LL3, LL4 and COM in response to the temperature data.

FIG. 14 illustrates a method of controlling the liquid lens.

As illustrated, the method of controlling the liquid lens may include a step of sensing a change in the temperature of the liquid lens (62), a step of determining variation in diopter corresponding to a change in temperature (64), and a step of adjusting the driving voltages to be supplied to four individual electrodes in response to the variation in diopter (66).

Here, the change in temperature may be sensed by the temperature sensor disposed at a position adjacent to the liquid lens, and the change in the temperature output from the temperature sensor may be transmitted in the form of data including 12-bit digital signals.

The step of determining variation in diopter may include a step of, when a signal corresponding to the change in temperature is transmitted, searching the storage unit for variation in diopter corresponding to the change in temperature. The variation in diopter stored in the storage unit may be measured and recognized through lens calibration, and may be recorded in a nonvolatile memory device.

Depending on the embodiment, at least a part of the process of determining the storage unit and the variation in diopter may be implemented in the form of a program or a batch file executed in a computer device, and the variation in diopter may be implemented as table-type or list-type code or data.

FIGS. 15*a* to 15*c* illustrate a second example of the temperature sensor in the camera module for measuring the temperature in the liquid lens.

FIG. 15*a* illustrates the connections between the driving circuit 54, the liquid lens 28, and the temperature sensor 32.

Referring to FIG. 15*a*, the liquid lens 28 is electrically connected to the driving circuit 54, which supplies a driving voltage, and to the temperature sensor 32. The driving circuit 54 may supply driving voltages to four individual electrodes and four common electrodes of the liquid lens 28. Different voltages may be applied to the four individual electrodes, and the same voltage may be applied to the four common electrodes.

Some of the four common electrodes of the liquid lens 28 may be electrically connected to the temperature sensor 32. The temperature sensor 32 may use a resistance value formed in the common electrodes of the liquid lens 28 as a method for measuring the internal temperature of the liquid lens 28.

FIG. 15*b* illustrates an equivalent circuit illustrating the method of measuring the temperature of the liquid lens 28.

Referring to FIG. 15*b*, the resistance value formed in the common electrodes of the liquid lens 28 is represented by one variable resistance R-len. When the temperature in the liquid lens 28 changes, the temperature of the liquid contained in the liquid lens 28 also changes. If the temperature of the liquid varies, the temperature of the common electrodes, which are in contact with the liquid, may also vary. Referring to FIG. 4, the first electrode 132, which is used as the common electrode, is exposed to one of the two liquids, i.e. the conductive liquid 122. If the temperature of the common electrodes varies, the resistance value between the common electrodes also varies. For example, the common electrodes C0 of the liquid lens 28 may be implemented as a thin film, and may have a sheet resistance of several tens of ohms. When the temperature of the common electrodes C0 varies, the change in resistance R in response to the change in temperature may be expressed as follows.

$$R = R0(1+at)$$

Here, R0 is the initial sheet resistance, a is the temperature coefficient of the resistance (unit: ° C.−1), and t is the temperature (unit: ° C.).

Therefore, it is possible to determine the temperature of the liquid lens 28 using a method of modeling the resistance value between the common electrodes as one variable resistance R-len and recognizing a change in the ratio of the variable resistance to a reference resistance R-o of the temperature sensor 32 (e.g. a voltage-dividing method). Alternatively, it is possible to measure the resistance value of the common electrodes, which is modeled as one variable resistance R-len, using a voltage (about 3 to 5 V or less), which is very low compared to the driving voltage of the liquid lens.

Depending on the embodiment, the circuit configuration in the temperature sensor 32 may vary. For example, in order to overcome the error of the voltage divider in the temperature sensor 32 so as to sense a fine change in the temperature of the liquid lens 28, the temperature sensor 32 may further include a plurality of resistors and switch elements.

FIG. 15*c* illustrates the timing for sensing the change in the temperature of the liquid lens 28.

Referring to FIG. 15*c*, the change in the temperature of the liquid lens 28 may be sensed at the time point at which a driving voltage is applied to the common electrodes C0 (refer to FIG. 3) and a ground voltage is applied to the individual electrodes L1 to L4 (refer to FIG. 3). In order to sense the resistance between the common electrodes C0, the driving voltage applied to the common electrodes C0 may be floated.

The driving voltage applied to the common electrodes C0 and the individual electrodes L1 to L4 may be of a pulse type, and may be supplied at the same time point or at different time points. In order to sense the change in temperature, as described with reference to FIG. 15b, the resistance R-len between the common electrodes in the liquid lens 28 may be measured by floating the driving voltage applied to the common electrodes C0 and supplying a voltage for sensing the resistance R-len to one side of a predetermined common electrode C0 (the opposite side thereof is connected to the temperature sensor 32).

If the driving voltage applied to the common electrodes C0 of the liquid lens 28 is floated for a short time and a voltage for measuring the temperature is supplied thereto, it is possible to minimize the influence of the temperature-measuring operation on the interface 30 (refer to FIG. 4) of the liquid lens 28.

FIGS. 16a to 16c illustrate a first example of the liquid lens module.

FIG. 16a illustrates the common electrode 132 of the liquid lens 28. The common electrode 132 is formed outside the lens region 310 disposed at the center of the liquid lens 28. The common electrode 132 may be implemented in the form of a thin film, and may have a predetermined pattern.

Referring to FIGS. 3 and 16a, the common electrode 132 may receive a driving voltage through four corner contacts C0a, C0b, C0c and C0d. Unlike the individual electrodes, the same driving voltage may be applied to the four corner contacts C0a, C0b, C0c and C0d of the common electrode 132 at the same time point.

FIG. 16b illustrates a connection unit 82 for transmitting a driving voltage to the common electrode 132 of the liquid lens 28 through the four corner contacts C0a, C0b, C0c and C0d. The connection unit 82 may be implemented as a flexible printed circuit board (FPCB), and the contacts C0a, C0b, C0c and C0d located at the four corners of the liquid lens 28 may be connected to the common voltage terminal C0. The connection unit 82 may include separate terminals TM1 and TM2 for measuring the resistance of the common electrode 132.

FIG. 16c illustrates an equivalent circuit including elements forming the resistance R-len (refer to FIG. 15b) of the common electrode 132 of the liquid lens 28. Specifically, an example of measuring the resistance R-len of the common electrode 132 will be described with reference to a change in the resistance between the third contact C0c and the fourth contact C0d. The configuration of the equivalent circuit may vary depending on the embodiment, e.g. depending on the method of selecting two different contacts to measure the resistance R-len.

Referring to FIG. 16c, the sheet resistance of the common electrode 132, which is implemented in the form of a thin film, and the resistance R-liq of the conductive liquid, which in contact with the common electrode 132, are present between the four corner contacts C0a, C0b, C0c and C0d of the common electrode 132. The sheet resistance of the common electrode 132 may include the resistance between two adjacent contacts, e.g. the resistance R-ab between the first contact C0a and the second contact C0b, the resistance R-bc between the second contact C0b and the third contact C0c, the resistance R-cd between the third contact C0c and the fourth contact C0d, and the resistance R-da between the fourth contact C0d and the first contact C0a. In addition, the sheet resistance of the common electrode 132 may include the resistance in a diagonal direction (i.e. the resistance between the second contact C0b and the fourth contact C0d). Since the conductive liquid includes an electrolyte component such as salt, current may flow therethrough. Thus, the resistance R-liq of the conductive liquid may also be included in the resistance R-len of the common electrode 132.

The connection relationship (serial or parallel connection) between the respective resistance components included in the resistance R-len of the common electrode 132 may be understood as shown in FIG. 16c. The resistance value of each resistance component varies in response to a change in temperature, which may be measured by the temperature sensor 32, which is of a voltage-divider type, as described with reference to FIG. 15b.

The resistance component R-liq attributable to the conductive liquid has a much larger value than the other resistance components R-ab, R-bc, R-cd, R-bd and R-da formed between the contacts. For example, the resistance component R-liq attributable to the conductive liquid may have a resistance value of about 150Ω (ohms). In contrast, the resistance components formed between the contacts of the common electrode 132, which is implemented as a conductive thin film, may have a small resistance value of several ohms to several milliohms or even several microohms. It can be understood that the resistance component R-liq attributable to the conductive liquid has a much larger resistance value than the other resistance components R-ab, R-bc, R-cd, R-bd and R-da and that the resistance component R-liq attributable to the conductive liquid and the other resistance components R-ab, R-bc, R-cd, R-bd and R-da are connected substantially in parallel. If two resistors are connected in parallel, the sum R of the two resistance values is equal to the reciprocal of the sum of the reciprocal of the resistance value R1 and the reciprocal of the resistance value R2 (e.g. $1/R=1/R1+1/R2$). Therefore, even when the change in the resistance R-len of the common electrode 132 occurs in response to a change in temperature, this is influenced more by the change in the resistance values of the resistance components R-ab, R-bc, R-cd, R-bd and R-da than the change in the resistance value of the resistance component R-liq attributable to the conductive liquid.

Even though the change in the resistance value of the resistance component R-liq attributable to the conductive liquid may be disregarded when taking an approximation approach, the resistance components present between the four corner contacts C0a, C0b, C0c and C0d of the common electrode 132 or C0, described with reference to FIG. 16a, are relatively complicated. Thus, it may be difficult to sense a change in resistance value in response to a change in temperature. As a result, if the number of resistance components present between the four corner contacts C0a, C0b, C0c and C0d of the electrode 132 or C0 is reduced, it may be possible to more easily sense the change in resistance value in response to a change in temperature.

Referring to FIGS. 16b and 16c, when the liquid lens 28 is operated, the driving voltage supplied through the common voltage terminal C0 is transmitted to all of the contacts C0a, C0b, C0c and C0d located at the four corners. However, during the measurement of the temperature of the liquid lens 28, the driving voltage supplied through the common voltage terminal C0 may be floated. At this time, as illustrated in FIG. 16c, the first to third contacts C0a, C0b and C0c, among the contacts C0a, C0b, C0c and C0d located at the four corners, are connected to the first temperature terminal TM1, and the fourth contact C0d may be connected to the second temperature terminal TM2. In order to enable such selective connection, a switch (not shown) needs be included between the common voltage terminal C0 and the fourth contact C0d in the connection unit 82. When the driving voltage is floated, the switch may be turned off in order to interrupt the electrical connection between the common voltage terminal C0 and the fourth contact C0d.

FIGS. 17a to 17c illustrate a second example of the liquid lens module.

FIG. 17a illustrates the common electrode 132a of the liquid lens 28. The common electrode 132 is formed outside the lens region 310 disposed at the center of the liquid lens 28. The common electrode 132 may be implemented in the form of a thin film, and may have a predetermined pattern. The difference between the common electrode 132 shown in FIG. 16a and the common electrode 132a shown in FIG. 17a is a void pattern 86.

Referring to FIGS. 3 and 17a, the common electrode 132a may receive a driving voltage through four corner contacts C0a, C0b, C0c and C0d. Unlike the individual electrodes, the same driving voltage may be applied to the four corner contacts C0a, C0b, C0c and C0d of the common electrode 132a at the same time point. The void or slit pattern 86 included in the common electrode 132a does not interrupt the application of the same driving voltage to the common electrode 132a. Although the void pattern 86 is included in the common electrode 132a, all of the regions of the common electrode 132a are electrically connected to each other.

However, the void pattern 86 may interrupt the direct electrical connection between the first contact C0a and the fourth contact C0d, and may interrupt the direct electrical connection between the second contact C0b and the fourth contact C0d. To this end, depending on the embodiment, the void pattern 86 may divide the common electrode 132a into two regions, which are electrically disconnected from each other, or may be disposed so as to extend from the fourth contact C0d to the periphery of the third contact C0c across the lens region 310.

Although the common electrode 132a has the shape of a conductive thin film and two contacts, e.g. the third contact C0c and the fourth contact C0d, are electrically connected to two other contacts, e.g. the first contact C0a and the second contact C0b, the void pattern 86 may restrict the free movement of charges. The void pattern 86 may be disposed parallel to the third contact C0c and the fourth contact C0d, and may physically separate the lens region 310 of the liquid lens 28 and the region between the third contact C0c and the fourth contact C0d from each other.

FIG. 17b illustrates a connection unit 82 for transmitting a driving voltage to the common electrode 132a of the liquid lens 28 through the four corner contacts C0a, C0b, C0c and C0d. The connection unit 82 may be implemented as a flexible printed circuit board (FPCB), and the contacts C0a, C0b, C0c and C0d located at the four corners of the liquid lens 28 may be connected to the driving voltage terminal C0. The connection unit 82 may include separate terminals TM1 and TM2 for measuring the resistance of the common electrode 132a.

FIG. 17c illustrates an equivalent circuit including elements forming the resistance R-len (refer to FIG. 11b) of the common electrode 132a of the liquid lens 28. Specifically, an example of measuring the resistance R-len of the common electrode 132 will be described with reference to a change in the resistance between the third contact C0c and the fourth contact C0d. The configuration of the equivalent circuit may vary depending on the embodiment, e.g. depending on the method of selecting two different contacts to measure the resistance R-len.

Referring to FIG. 17c, the sheet resistance of the common electrode 132a, which is implemented in the form of a thin film, and the resistance R-liq of the conductive liquid, which in contact with the common electrode 132, are present between the four corner contacts C0a, C0b, C0c and C0d of the common electrode 132a. However, unlike the common electrode 132 shown in FIG. 16a, the resistance components to be considered may be greatly reduced in the common electrode 132a shown in FIG. 17a due to the void pattern 86. The sheet resistance of the common electrode 132 may include the resistance between two adjacent contacts, e.g. the resistance R-ab between the first contact C0a and the second contact C0b, the resistance R-bc between the second contact C0b and the third contact C0c, and the resistance R-cd between the third contact C0c and the fourth contact C0d. However, the resistance R-da between the fourth contact C0d and the first contact C0a shown in FIG. 16c may be eliminated because the electrical connection therebetween is interrupted by the slit or void pattern 86. The connection unit may include at least two terminals electrically connected to the common electrode. One of the terminals may include three contact regions with the common electrode, and the other terminal may include a single contact region with the common electrode. The common electrode may include a slit pattern, which is disposed adjacent to the single contact region of one terminal. Alternatively, the slit pattern may be disposed adjacent to one of the multiple contact regions of one terminal.

The resistance in a diagonal direction (i.e. the resistance between the second contact C0b and the fourth contact C0d) may be eliminated from the sheet resistance of the common electrode 132 because the electrical connection therebetween is interrupted by the void pattern 86. Since the conductive liquid includes an electrolyte component such as salt, current may flow therethrough. Thus, the resistance R-liq of the conductive liquid may also be included in the resistance R-len of the common electrode 132.

As described above, the resistance component R-liq attributable to the conductive liquid has a much larger value than the other resistance components R-ab, R-bc, R-cd, R-bd and R-da formed between the contacts. For example, the resistance component R-liq attributable to the conductive liquid may have a resistance value of about 150Ω (ohms). In contrast, the resistance components formed between the contacts of the common electrode 132, which is implemented as a conductive thin film, may have a small resistance value of several ohms to several milliohms or even several microohms. It can be understood that the resistance component R-liq attributable to the conductive liquid has a much larger resistance value than the other resistance components R-ab, R-bc, R-cd, R-bd and R-da and that the resistance component R-liq attributable to the conductive liquid and the other resistance components R-ab, R-bc, R-cd, R-bd and R-da are connected substantially in parallel. If two resistors are connected in parallel, the sum R of the two resistance values is equal to the reciprocal of the sum of the reciprocal of the resistance value R1 and the reciprocal of the resistance value R2 (e.g. 1/R=1/R1+1/R2). Therefore, even when the change in the resistance R-len of the common electrode 132 occurs in response to a change in temperature, this is influenced more by the change in the resistance values of the resistance components R-ab, R-bc, R-cd, R-bd and R-da than the change in the resistance value of the resistance component R-liq attributable to the conductive liquid.

If the change in the resistance value of the resistance component R-liq attributable to the conductive liquid is disregarded by taking an approximation approach, among the resistance components present between the four corner contacts C0a, C0b, C0c and C0d of the common electrode 132a or C0, described with reference to FIG. 17a, only the resistance component R-cd between the two contacts C0c and C0d remains.

The connection relationship (serial or parallel connection) between the respective resistance components included in the resistance R-len of the common electrode 132 may be understood as shown in FIG. 17c. The resistance value of each resistance component varies in response to a change in temperature, which may be measured by the temperature sensor 32, which is of a voltage-divider type, as described with reference to FIG. 15b. Comparing FIG. 16c and FIG. 17c, it can be seen that the resistance components forming the resistance R-len of the common electrode 132 are reduced due to the void pattern 86 shown in FIG. 17a. With the reduction in the resistance components forming the resistance R-len of the common electrode 132, it may be possible to more easily and accurately measure the resistance R-len of the common electrode 132.

Referring to FIGS. 17b and 17c, when the liquid lens 28 is operated, the driving voltage supplied through the common voltage terminal C0 is transmitted to all of the contacts C0a, C0b, C0c and C0d located at the four corners. However, during the measurement of the temperature of the liquid lens 28, the driving voltage supplied through the common voltage terminal C0 may be floated. At this time, as illustrated in FIG. 16c, the first to third contacts C0a, C0b and C0c, among the contacts C0a, C0b, C0c and C0d located at the four corners, are connected to the first temperature terminal TM1, and the fourth contact C0d may be connected to the second temperature terminal TM2. In order to enable such selective connection, a switch (not shown) needs be included between the common voltage terminal C0 and the fourth contact C0d in the connection unit 82. When the driving voltage is floated, the switch may be turned off in order to interrupt the electrical connection between the common voltage terminal C0 and the fourth contact C0d.

The above-described liquid lens may be included in a camera module. The camera module may include a lens assembly, which includes a liquid lens mounted in a housing and at least one solid lens disposed on the front surface or the rear surface of the liquid lens, an image sensor converting an optical signal transmitted through the lens assembly into an electrical signal, and a control circuit supplying a driving voltage to the liquid lens. The liquid lens may include a common electrode and a plurality of individual electrodes. A first terminal forming a plurality of contact regions with the common electrode and a second terminal forming a single contact region with the common electrode may be disposed on the common electrode. The common electrode may include a slit pattern, which is disposed adjacent to the single contact region, which contacts the second terminal. The common electrode may include a slit (groove) pattern, which is disposed adjacent to two of the multiple contact regions.

The method according to the embodiment described above may be programmed to be executed in a computer and may be stored on a computer-readable recording medium. Examples of the computer-readable recording medium include ROM, RAM, CD-ROMs, magnetic tapes, floppy disks, and optical data storage devices.

The computer-readable recording medium may also be distributed over network-coupled computer systems so that the computer-readable code is stored and executed in a distributed fashion. Also, functional programs, code, and code segments for accomplishing the above-described method may be easily construed by programmers skilled in the art to which the embodiment pertains.

Although only a limited number of embodiments have been described above, various other embodiments are possible. The technical contents of the above-described embodiments may be combined into various forms as long as they are not incompatible with one another, and thus may be implemented in new embodiments.

It will be apparent to those skilled in the art that various changes in form and details may be made without departing from the spirit and the essential characteristics of the disclosure set forth herein. Accordingly, the above detailed description is not intended to be construed as limiting the disclosure in all aspects and to be considered by way of example. The scope of the disclosure should be determined by reasonable interpretation of the accompanying claims, and all equivalent modifications made without departing from the disclosure should be included in the scope of the disclosure.

The invention claimed is:

1. A camera module, comprising:
  a liquid lens, the liquid lens comprising:
    a first plate comprising a cavity in which a conductive liquid and a non-conductive liquid are disposed;
    a first electrode disposed on the first plate;
    a second electrode disposed under the first plate;
    a second plate disposed on the first electrode; and
    a third plate disposed under the second electrode;
  a lens holder accommodating the liquid lens and a solid lens therein;
  a sensor substrate on which an image sensor is disposed, the sensor substrate being disposed under the lens holder;
  a control unit disposed on the sensor substrate, the control unit controlling a voltage to be applied to the first electrode and the second electrode;
  a connection unit configured to electrically connect the first electrode or the second electrode to the sensor substrate; and
  a temperature sensor disposed on the connection unit,
  wherein the lens holder comprises a recess in which the temperature sensor is disposed,
  wherein the connection unit comprises:
    a first terminal part connected to the liquid lens; and
    a second terminal part connected to the sensor substrate,
  wherein the second terminal part comprises a voltage supply terminal configured to be electrically connected to the liquid lens and a first sensor terminal configured to be electrically, connected to the temperature sensor, and
  wherein the sensor substrate comprises a second sensor terminal connected to the voltage supply terminal and a third sensor terminal connected to the temperature sensor.

2. The camera module according to claim 1, wherein the liquid lens comprises a lens region, in which the conductive liquid and the non-conductive liquid are disposed, and a rib region surrounding the lens region, and,
  wherein the temperature sensor is disposed on or under the rib region.

3. The camera module according to claim 2, wherein the second electrode includes a plurality of individual electrodes, and
  wherein the connection unit comprises:
    a first flexible printed circuit board transmitting a voltage to each of the individual electrodes; and
    a second flexible printed circuit board connecting the first electrode to a ground voltage, and wherein the first flexible printed circuit board and the second flexible printed circuit board are located at opposite sides of the lens region.

4. The camera module according to claim 3, wherein the connection unit transmits to the control unit a change in temperature of the liquid lens output from the temperature sensor, and transmits to the temperature sensor a driving voltage for driving the temperature sensor and an activation signal for activating the temperature sensor.

5. The camera module according to claim 1, wherein the temperature sensor outputs a change in temperature of the liquid lens in a form of a 12-bit digital signal.

6. The camera module according to claim 1, wherein the second electrode includes a plurality of individual electrodes, and
wherein the control unit determines different driving voltages for respective ones of the individual electrodes in order to perform a compensation operation for optical image stabilization (OIS).

7. The camera module according to claim 1, further comprising:
a gyro sensor configured to sense movement of the camera module and to output a sensing signal corresponding to the movement,
wherein the control circuit determines a level of a voltage applied to the first and second electrodes in response to the sensing signal and a change in temperature of the liquid lens.

8. The camera module according to claim 1, further comprising:
a storage unit configured to store variation in diopter corresponding to a change in temperature of the liquid lens,
wherein the control unit recognizes the variation in diopter corresponding to a change in temperature of the liquid lens from data stored in the storage unit.

9. A method of controlling the liquid lens included in the camera module of claim 1, the first electrode comprising a common electrode and the second electrode comprising four individual electrodes to adjust an interface formed by the conductive and non-conductive liquids, the method comprising:
sensing a change in temperature of the liquid lens;
determining variation in diopter corresponding to the change in temperature; and
adjusting voltages to be supplied to the four individual electrodes in response to the variation in diopter.

10. A camera module, comprising:
a liquid lens, the liquid lens comprising:
a first plate comprising a cavity in which a conductive liquid and a nonconductive liquid are disposed;
a first electrode disposed on the first plate;
a second electrode disposed under the first plate;
a second plate disposed on the first electrode; and
a third plate disposed under the second electrode;
a lens holder accommodating the liquid lens and a solid lens therein;
a sensor substrate on which an image sensor is disposed, the sensor substrate being disposed under the lens holder;
a control unit disposed on the sensor substrate, the control unit controlling a voltage to be applied to the first electrode and the second electrode;
a connection unit configured to electrically connect the first electrode or the second electrode to the sensor substrate; and
a temperature sensor disposed on the liquid lens,
wherein the liquid lens comprises a lens region, in which the conductive liquid and the non-conductive liquid are disposed, and a rib region surrounding the lens region,
wherein the temperature sensor is disposed on the rib region,
wherein the connection unit comprises:
a first terminal part connected to the liquid lens; and
a second terminal part connected to the sensor substrate,
wherein the second terminal part comprises a voltage supply terminal configured to be electrically connected to the liquid lens and a first sensor terminal configured to be electrically connected to the temperature sensor, and
wherein the sensor substrate comprises a second sensor terminal connected to the voltage supply terminal and a third sensor terminal connected to the temperature sensor.

* * * * *